(12) United States Patent
Carlson et al.

(10) Patent No.: US 8,802,792 B2
(45) Date of Patent: Aug. 12, 2014

(54) PARTIALLY HYDROGENATED BISPHENOL-A-BASED POLYMERS AS SUBSTITUTES FOR BISPHENOL-A-BASED POLYMERS

(75) Inventors: William B. Carlson, Seattle, WA (US); Gregory D. Phelan, Cortland, NY (US); Phillip A. Sullivan, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 173 days.

(21) Appl. No.: 13/145,291

(22) PCT Filed: Sep. 17, 2010

(86) PCT No.: PCT/US2010/049316
§ 371 (c)(1),
(2), (4) Date: Jul. 19, 2011

(87) PCT Pub. No.: WO2012/036699
PCT Pub. Date: Mar. 22, 2012

(65) Prior Publication Data
US 2012/0070593 A1  Mar. 22, 2012

(51) Int. Cl.
*C08G 59/14* (2006.01)
(52) U.S. Cl.
USPC .......................... 525/523; 525/528; 528/418
(58) Field of Classification Search
USPC .................................. 525/523, 528; 528/418
See application file for complete search history.

(56) References Cited

U.S. PATENT DOCUMENTS

| | | | |
|---|---|---|---|
| 2,482,761 A | 6/1949 | Goebel | |
| 2,997,459 A | 8/1961 | Schnell et al. | |
| 3,061,559 A | 10/1962 | Henson et al. | |
| 3,157,622 A | 11/1964 | Goldberg | |
| 3,161,615 A | 12/1964 | Goldberg et al. | |
| 3,306,356 A | 2/1967 | Sparlin | |
| 3,310,528 A | 3/1967 | Garnish | |
| 3,462,515 A | 8/1969 | Cantrill | |
| 3,493,631 A | 2/1970 | Christenson et al. | |
| 3,759,854 A | 9/1973 | Chang et al. | |
| 3,799,950 A | 3/1974 | Margotte et al. | |
| 4,518,724 A | 5/1985 | Kuwajima et al. | |
| 4,557,976 A | 12/1985 | Geist et al. | |
| 4,943,359 A * | 7/1990 | Patzschke et al. | 204/479 |
| 5,064,885 A | 11/1991 | Muller et al. | |
| 5,322,907 A | 6/1994 | Cotting et al. | |
| 5,326,917 A | 7/1994 | Feiring et al. | |
| 5,364,917 A | 11/1994 | Babb et al. | |
| 5,405,670 A | 4/1995 | Wetzel et al. | |
| 5,510,414 A | 4/1996 | Okamoto et al. | |
| 5,739,215 A | 4/1998 | Westerhof et al. | |
| 6,087,417 A * | 7/2000 | Stevenson et al. | 523/414 |
| 6,413,648 B1 | 7/2002 | Heyenk et al. | |
| 7,321,014 B2 | 1/2008 | Glasgow et al. | |
| 2001/0000742 A1 | 5/2001 | Karhuketo et al. | |
| 2004/0147638 A1 | 7/2004 | Kim et al. | |
| 2005/0191476 A1 * | 9/2005 | Oosedo et al. | 428/292.1 |
| 2007/0281179 A1 | 12/2007 | Ambrose et al. | |
| 2008/0015302 A1 | 1/2008 | Kiefer-Liptak et al. | |
| 2008/0236449 A1 | 10/2008 | Yang et al. | |
| 2009/0020039 A1 * | 1/2009 | Fenn et al. | 106/218 |
| 2009/0030128 A1 | 1/2009 | Chakravarti et al. | |
| 2009/0054613 A1 | 2/2009 | Sehgal et al. | |
| 2011/0313082 A1 * | 12/2011 | Popp | 523/443 |
| 2012/0149266 A1 * | 6/2012 | Costantino et al. | 442/103 |

FOREIGN PATENT DOCUMENTS

| | | |
|---|---|---|
| CN | 1673250 | 9/2005 |
| DE | 10 11 148 | 6/1957 |
| DE | 19 56 490 | 7/1970 |
| DE | 21 19 161 | 1/1976 |
| DE | 33 22 766 | 3/1984 |
| DE | 37 17 451 | 12/1988 |
| EP | 0 491 529 | 6/1992 |
| EP | 0 506 617 | 9/1992 |
| EP | 0 545 576 | 6/1993 |
| EP | 1 036 827 | 9/2000 |
| EP | 1 118 629 | 7/2001 |
| FR | 1361290 | 5/1964 |
| FR | 1391473 | 3/1965 |
| GB | 2 355 267 | 4/2001 |
| JP | 37013866 | 9/1962 |
| JP | S5964673 | 4/1984 |
| JP | S59117565 | 7/1984 |
| JP | S6081261 | 5/1985 |
| JP | H01217401 | 8/1989 |
| JP | 01-223119 | 9/1989 |
| JP | 02-022371 | 1/1990 |
| JP | H04108826 | 4/1992 |
| JP | 10-183052 | 7/1998 |
| JP | 2000-047388 | 2/2000 |

(Continued)

OTHER PUBLICATIONS

Asplund, B. et al., "Effects of hydrolysis on a new biodegradable co-polymer," J. Biomater. Sci. Polymer Edn., 2006, vol. 17, No. 6, pp. 615-630.

Bair, H.E. et al., "Hydrolysis of Polycarbonate to Yield BPA," J. App. Poly. Sci., 1981, vol. 26, pp. 1777-1786.

Bair, H.E. et al., "Water sorption of polycarbonate and its effect on the polymers dielectric behavior," J. App. Phys., Oct. 1978, vol. 49, No. 10, pp. 4976-4984.

Barnes, H.M., "Coating Durability on Organolead-Treated Southern Pine in Exterior Exposure," Journal of Coatings Technology, Apr. 1979, vol. 51, No. 651, pp. 43-45.

Blaga, A., "Effects of cycloaliphatic and alkylarylic glycols on the relations between the chemical structure and the properties of fatty acid modified isophthalic alkyd resins," Farbe and Lack, 1973, vol. 79, No. 5, pp. 413-419 (with English abstract).

(Continued)

*Primary Examiner* — Robert Jones, Jr.
(74) *Attorney, Agent, or Firm* — Foley & Lardner LLP

(57) ABSTRACT

Partially hydrogenated bisphenol-A based polymers. Coating compositions for food or beverage containers and medical devices, including a partially hydrogenated bisphenol-A based polymer. Food or beverage containers and medical devices coated with partially hydrogenated bisphenol-A based polymers. Food or beverage containers and medical devices made from partially hydrogenated bisphenol-A based polymers.

8 Claims, 21 Drawing Sheets

(56) References Cited

FOREIGN PATENT DOCUMENTS

| | | |
|---|---|---|
| JP | 2004-143455 | 5/2004 |
| JP | 2005-248135 | 9/2005 |
| JP | 2009-067893 | 4/2009 |
| NL | 297988 | 10/1965 |
| WO | WO-02/14953 | 2/2002 |
| WO | WO-02/069704 | 9/2002 |
| WO | WO2004/058892 | 7/2004 |
| WO | WO-2006/045017 | 4/2006 |
| WO | WO-2009/037574 | 3/2009 |
| WO | WO-2009/044283 | 4/2009 |
| WO | WO 2010099281 A1 * | 9/2010 |
| WO | WO 2011000646 A1 * | 1/2011 |

OTHER PUBLICATIONS

Cao, X.L. et al., "Levels of Bisphenol A in Canned Soft Drink Products in Canadian Markets," J. Agric. Food. Chem., 2009, vol. 57, No. 4, pp. 1307-1311.

Choi, W.S. et al., "Synthesis and polymerization of trifluorovinylether-terminated imide oligomers," Polymer, 2000, vol. 41, pp. 6213-6221.

Eisenschiml, G., "Changes in Wood Oil and Tung Oil on Prolonged Storage," Paint, Oil and Chemical Review, Jan. 10, 1946, vol. 109, No. 1, pp. 16 and 18.

Gardner, R.J. et al., "Humid Aging of Plastics: Effect of Molecular Weight on Mechanical Properties and Fracture Morphology of Polycarbonate," Journal of Applied Polymer Science, 1979, vol. 24, pp. 1269-1280.

Grause, G. et al., "Pyrolytic hydrolysis of polycarbonate in the presence of earth-alkali oxides and hydroxides," Polymer Degradation and Stability, 2009, vol. 94, pp. 1119-1124.

Hayes, B.T., "The Relationship Between Chemical Structure and Properties of Polyester Resins," SPE Transactions, Apr. 1964, vol. 4, No. 2, pp. 90-97.

Hong, K.Z. et al., "Explaining Ductility Loss in Steam-Sterilized Polycarbonate," Med. Plast. Biomat., May/Jun. 1996, pp. 14, 16, 18 and 20.

Howe, S.R. et al., "Potential exposure to bisphenol A from food-contact use of polycarbonate resins," Food Addit. and Contam., 1998, vol. 15, No. 3, pp. 370-375.

International Search Report and Written Opinion for Intl. Pat. Appln. No. PCT/US2010/049316, mailed Dec. 6, 2010, 8 pp.

Kanai, T. et al., "Synthesis and characterization of novel silicone acrylate-soya alkyd resin as binder for long life exterior coatings," Progress in Organic Coatings, 2007, vol. 58, pp. 259-264.

Kang, J.H. et al., "Bisphenol A migration from cans containing coffee and caffeine," Food Addit. and Contam., 2002, vol. 19, No. 9, pp. 886-890.

Kawamura, Y. et al., "Migration of Bisphenol A from Can Coatings to Drinks," J. Food Hygienic Society of Japan, 1999, vol. 40, No. 2, pp. 158-165 (with English abstract).

Mandich, A. et al., "In vivo exposure of carp to graded concentrations of bisphenol A," Gen. and Comp. Endocr., 2007, vol. 153, pp. 15-24.

Mercea, P., "Physicochemical Processes Involved in Migration of Bisphenol A from Polycarbonate," Journal of Applied Polymer Science, 2009, vol. 112, pp. 579-593.

Mountfort, K.A. et al., "Investigations into the potential degradation of polycarbonate baby bottles during sterilization with consequent release of bisphenol A," Food Additives and Contaminants, 1997, vol. 14, No. 6-7, pp. 737-740.

Munguía-López, E.M. et al., "Migration of bisphenol A (BPA) from can coatings into a fatty-food simulant and tuna fish," Food Additives and Contaminants, 2005, vol. 22, No. 9, pp. 892-898.

Munguía-López, E.M. et al., "Migration of Bisphenol A (BPA) from Epoxy Can Coatings to Jalapeño Peppers and an Acid Food Simulant," J. Agric. Food Chem., 2002, vol. 50, No. 25, pp. 7299-7302.

Oehlmann, J. et al., "A critical evaluation of the environmental risk assessment for plasticizers in the freshwater environment in Europe, with special emphasis on bisphenol A and endocrine disruption," Environmental Research, 2008, vol. 108, pp. 140-149.

Pryde, C.A. et al., "Hydrolytic Stability of Some Commercially Available Polycarbonates," Polymer Engineering & Science, Apr. 1982, vol. 22, No. 6, pp. 370-375.

Pryde, C.A. et al., "Solid State Hydrolysis of Bisphenol-A Polycarbonate. I. Effect of Phenolic End Groups," Journal of Applied Polymer Science, 1980, vol. 25, pp. 2573-2587.

Pu, X. et al., "Synthesis and Degradation of Copolymer of Styrene and Tung Oil Initiated by Self-oxidization of Tung Oil," Chemistry and Industry of Forest Products, Mar. 2006, vol. 26, No. 1, pp. 37-40 (with English abstract).

Ritter, H.S., "Durability of Paint Films From Erosion Rate Studies," Journal of Paint Technology, Jan. 1971, vol. 43, No. 552, pp. 74-82.

Robinson, R.S., "The Modification of Alkyd Resins," Journal of the Oil and Colour Chemists' Association, Aug. 1950, vol. 33, No. 362, pp. 353-365.

Sekizawa, J., "Low-dose effects of bisphenol A: a serious threat to human health?," J. Toxicol. Sci., 2008, vol. 33, No. 4, pp. 389-403.

Simoneau, C. et al., "Monitoring of bisphenol-A-diglycidyl-ether (BADGE) in canned fish in oil," Food Additives and Contaminants, 1999, vol. 16, No. 5, pp. 189-195.

Turpin, E.T., "Hydrolysis of Water-Dispersible Resins," J. Paint. Technol., Mar. 1975, vol. 47, No. 602, pp. 40-46.

Vandenberg, L.N. et al., "Human exposure to bisphenol A (BPA)," Reproductive Toxicology, 2007, vol. 24, pp. 139-177.

Vom Saal, F., "Bisphenol A Eliminates Brain and Behavior Sex Dimorphisms in Mice: How Low Can You Go?" Endocrinology, 2006, vol. 147, No. 8, pp. 3679-3680.

Welshons, W.V. et al., "Large Effects from Small Exposures. III. Endocrine Mechanisms Mediating Effects of Bisphenol A at Levels of Human Exposure," Endocrinology, 2006, vol. 147, No. 6, pp. S56-S69.

Woo, J.T.K. et al., "Synthesis and Characterization of Water-Reducible Graft Epoxy Copolymers," J. Coat. Technol., Jun. 1982, vol. 54, No. 689, pp. 41-55.

Woo, J.T.K. et al., "Theoretical Calculation of Grafting Sites in the Epoxy-G-Acrylic Copolymer," Polym. Mater. Sci. Eng., 1991, vol. 65, pp. 323-324.

International Preliminary Report on Patentability issued for PCT/US2010/049316 mailed Mar. 28, 2013.

Bicu, I. et al., "Diels-Alder polymerization of some derivatives of abietic acid," Die Angewandte Makromolekulare Chemie, 1999, vol. 264, No. 4585, pp. 21-29.

Final Office Action in U.S. Appl. No. 13/146,978 dtd May 6, 2013.

Heimeier, R. A. et al., "The xenoestrogen bisphenol A inhibits postembryonic vertebrate development by antagonizing gene regulation by thyroid hormone," Endocrinology, Jun. 2009, vol. 150, No. 6, pp. 2964-2973.

International Preliminary Report on Patentability issued for PCT/US2010/049290 mailed Mar. 28, 2013.

International Search Report and Written Opinion for PCT/US2010/049290 mailed Nov. 30, 2010.

Jung, S-H. et al., "Diels-Alder polymerization between bis(cyclopentadienone) and diacetylene: application for light-emitting material," Polymer Preprints, 2004, vol. 45, No. 1, pp. 885-886.

Katz, G. et al., "Subchronic inhalation toxicity study of a water-dispersible polyester in rats," Food Chem. Toxicol., 1997, vol. 35, pp. 1023-1030.

Kerle, E. J. et al., "Hydrogenated bisphenol in chemically resistant polyester resins," Proceedings of the 19th Annual Technical and Management Conference, Reinforced Plastics Div., Society of the Plastics Industry, Inc., Feb. 1964, Section 12-D, pp. 1-6.

Kim, D-J. et al., "Preparation and characterization of fluorenyl polymer electrolyte membranes containing PFCB groups," Memburein, Mar. 2006, vol. 16, No. 1, pp. 16-24.

Kita, K. et al., "Increase in the levels of chaperone proteins by exposure to beta-estradiol, bisphenol A and 4-methoxyphenol in human cells transfected with estrogen receptor alpha cDNA," Toxicology in Vitro, 2009, vol. 23, pp. 728-735.

Kumar, U. et al., "The Diels-Alder polymerization of biscyclopentadienones and ethynyl terminated imides," Polymeric Materials Science and Engineering, 1995, vol. 72, pp. 444-445.

(56) References Cited

OTHER PUBLICATIONS

Ma, H. et al., "Highly efficient and thermally stable electro-optical dendrimers for photonics," Advanced Functional Materials, 2002, vol. 12, No. 9, pp. 565-574.

Maegawa, T., et al. (2009), Efficient and Practical Arene Hydrogenation by Heterogeneous Catalysts under Mild Conditions. Chem. Eur. J., 15: 6953-6963. doi: 10.1002/chem.200900361 (Sep. 2009).

Naik, P. et al., "Cytogenetic evaluation for genotoxicity of Bisphenol-A in bone marrow cells of Swiss albino mice," Mutat. Res., 2009, vol. 676, pp. 106-112.

Non-Final Office Action in U.S. Appl. No. 13/146,978 dtd Jan. 31, 2013.

Passos, A. et al., "A yeast assay based on the gilthead sea bream (teleost fish) estrogen receptor beta for monitoring estrogen mimics," Ecotoxicology and Environmental Safety, 2009, vol. 72, pp. 1529-1537.

Ruff, D. H. et al., "Synthesis and characterization of new bis-dienophiles for Diels-Alder polymerization," Synthetic Metals, 1995, vol. 69, pp. 579-580.

Stille, J. K. et al., "A novel Diels-Alder polymerization," Journal of Polymer Science, 1964, vol. 2, pp. 1487-1491.

Suh, D. H. et al., "Synthesis and properties of highly phenyl-substituted fluorene copolymers containing hole and electron transporting moieties via Diels-Alder polymerization," Molecular Crystals and Liquid Crystals, 2004, vol. 424, pp. 159-165.

Taylor, M. S. et al., "Six bioabsorbable polymers: in vitro acute toxicity of accumulated degradation products," J. Appl. Biomater., 1994, vol. 5, pp. 151-157.

Teramoto, N. et al., "Thermo-reversible Diels-Alder polymerization of difurfurylidene trehalose and bismaleimides," Carbohydrate Polymers, 2006, vol. 64, pp. 78-84.

Diedrich, D.F., et al., "Active site comparison of mutarotase with the glucose carrier in human erythrocytes," Archives of Biochemistry and Biophysics, 1970, vol. 138, Issue 2, pp. 499-505.

Gibson, R.L., "Toxic Baby Bottles: Scientific study finds leaching chemicals in clear plastic baby bottles," Environment California Research & Policy Center, 2007, 37 pages.

Kerle, E. J., "The Advantages of HBPA in chemical-resistant resins," SPE (Soc. Plastics Engrs.) Regional Technical Conference (1963), p. 59.

Mel'Nikova, L. V., "Toxicity and the danger of a series of substances," Gigiena I Sanitariya, 1981, No. 1, p. 94 (No English translation available).

Mingbo, H., et al., "Exudation processes in hydrogenated bisphenol-A-based epoxy coatings: Spectroscopic study," Journal of Applied Polymer Science, 1993, vol. 49, Issue 2, pp. 345-359.

Morita, Y., et al., "Non-catalytic anhydride curing of hydrogenated bisphenol-A glycidyl ether with 1,2,4-cyclohexanetricarboxylic anhydride and light emitting diode encapsulation," Journal of Applied Polymer Science, 2006, vol. 100, Issue 2, pp. 962-966.

Takeuchi, T., et al., "Positive relationship between androgen and the endocrine disruptor, bisphenol A, in normal women and women with ovarian dysfunction," Endocrine J., 2004, vol. 51, Issue 2, pp. 165-169.

Tanner, L. "Chicago City Council approves BPA baby bottle ban" Associated Press, accessed at http://www.realclearpolitics.com/news/ap/us_news/2009/May/13/chicago_city_council_approves_bpa_baby_bottle_ban.html, May 13, 2009, 2 pages.

Vargiu, S., "Glass-polyester composite materials resistant to chemical corrosion," Tecnopolimeri Resine, 1976, vol. 2, No. 3, pp. 17. (English Abstract Only).

* cited by examiner $X = C; R^1 = R^2 = H$      $R^3 = R^4 = R^5 = R^6 = H$
$X = C; R^1 = R^2 = CH_3$      $R^3 = R^4 = R^5 = R^6 = CH_3$
$X = C; R^1 = R^2 = CF_3$      $R^3 = R^4 = R^5 = R^6 = CF_3$
$X = C; R^1 = R^2 = C_6H_5$      $R^3 = R^4 = R^5 = R^6 =$ Halogen
$X = C; R^1 = R^2 = C_6H_{11}$      $R^3 = R^4 = R^5 = R^6 =$ alkyl
$X = C; R^1 = R^2 =$ alkyl
$X = C; R^1 = CH_3, R^2 = CH_2CH_3$      $XR^1R^2 = C-CH_2-CH_2$
$X = C; R^1 = CH_3, R^2 = CF_3$
$X = C; R^1 = CH_3, R^2 = CH_2CH_2OH$      $XR^1R^2 = C-CH_2-(CH_2)_n-CH_2$ $n = 0-7$ $XR^1R^2 = C-CF_2-CF_2$ $XR^1R^2 = C-CF_2-(CF_2)_n-CF_2$ $n = 0-7$ 6 No. 6 atoms x 4 = 24
5 No. 7 atoms      =  5
            total = 29
pHBPA (3, 4-alkene)

5 No. 6 atoms x 4 = 20
5 No. 7 atoms      =  5
            total = 25
pHBPA (2, 3-alkene)

3 No. 6 atoms x 4 = 12
9 No. 7 atoms      =  9
            total = 21
Neopentyl glycol 4 No. 6 atoms x 4 = 16
3 No. 7 atoms      =  3
            total = 19
Bisphenol-A 3 No. 6 atoms x 4 = 12
1 No. 7 atoms      =  1
            total = 13
Ethylene glycol

Examples of cross-linking through pHBPA.

PARTIALLY HYDROGENATED BISPHENOL-A-BASED POLYMERS AS SUBSTITUTES FOR BISPHENOL-A-BASED POLYMERS

CROSS-REFERENCE TO RELATED APPLICATIONS

This application is a national stage application of International Application Ser. No. PCT/US2010/049316, filed Sep. 17, 2010, the contents of which is hereby incorporated by reference in its entirety.

BACKGROUND 4,4'-(Propane-2,2-diyl)diphenol, more commonly known as bisphenol-A (BPA), is a widely used monomer for the production of polymers including epoxy resins, polyurethanes, polyacrylates and polycarbonates. The aromatic moieties of BPA are highly rigid, leading to polymers with great mechanical strength and high glass transition temperatures.

As a result, BPA-based polymers and resins are found in a wide range of products and applications, from consumer products to medical devices. For example, BPA-based epoxy resins are used for coil and can coatings for food and beverage containers; BPA-based polycarbonates and their copolymers are used to produce food containers including baby bottles, tableware, water bottles; and BPA-based polymers are used in medical devices including storage devices, renal dialysis devices, cardiac surgery products, surgical instruments, and intravenous connection components. Such widespread use has made BPA among the highest production volume industrial chemicals, leading to a substantial production infrastructure for the compound.

In recent years, health concerns have arisen regarding BPA-based polymers. Such polymers are susceptible to degradation and yellowing upon exposure to light, heat and certain chemicals. Upon degradation of the polymers, BPA and its derivatives can make its way into the contents of the food and beverage containers or medical storage devices and, subsequently, into the body. For example, BPA-containing polycarbonates have been shown to hydrolyze and release BPA monomers (see (a) Mercea, P., *J. Applied Polymer Science* (2009), 112(2), 579; (b) Kang, Jeong-Hun; Kondo, Fusao, *Food Additives & Contaminants* (2002), 19(9), 886; (c) Howe, Susan R.; Borodinsky, Lester, *Food Additives and Contaminants* (1998), 15(3), 370; and (d) Mountfort, Katrina A.; Kelly, Janet; Jickells, Sue M.; Castle, Laurence, *Food Additives and Contaminants* (1997), 14(6-7), 737). BPA is considered to be an endocrine disruptor and has been suggested to cause or contribute to birth defects, miscarriages, neurological problems, menstrual cycle disruptions, testicular disruption, and breast growth in males among other effects (see (a) Vandenberg, L. N. *Repro. Toxicol.* (2007) 24, 139; (b) Welshon, W. V., Nagel, S. C., vom Saal, F. S. *Endocrinology* (2006) 147(6), s56; and (c) vom Saal, F. *Endocrinology* (2006) 147(8), 3679). In view of these concerns, various government authorities around the world have become more restrictive in regulating the amounts of BPA in certain products, and bans on the use of BPA in certain products such as baby bottles, have been instituted in some countries.

SUMMARY OF THE TECHNOLOGY

As a replacement for BPA-based polymers, the present technology provides polymers containing partially hydrogenated BPA (4-[2-(4-hydroxycyclohexenyl)propan-2-yl]cyclohexen-1-ol; pHBPA) and derivatives of pHBPA. Such pHBPA-based polymers can be inexpensive, easy to make by using current infrastructure, and have low toxicity. pHBPA-based polymers of the present technology can exhibit hydrolytic stability, heat resistance and/or chemical resistance. Finally, the pHBPA-based polymers disclosed herein may be formulated for high flexibility and/or excellent adhesion. Thus, compositions including the present pHBPA-based polymers may be used in the manufacture of food and beverage containers and medical devices and in coatings for the same.

In accordance with one aspect, the present technology provides a polymer, including at least one repeating unit, wherein the repeating unit is a partially hydrogenated bisphenol-A containing unit. Such a pHBPA-based polymer may be an epoxy resin, a polyurethane, a polyacrylate graft copolymer, a polycarbonate, a polyester, or an alkyd resin. In some embodiments, the polymer includes a plurality of partially hydrogenated bisphenol-A containing units having the formula (I):

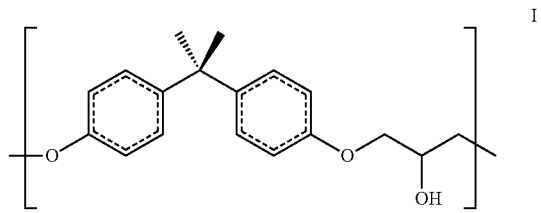

wherein the dashed line indicates the presence of one or two double bonds at any position within each ring. In some embodiments, each ring of the partially hydrogenated bisphenol-A containing unit contains one double bond.

In some embodiments of the present technology, the polymer is an epoxy resin. The epoxy resin may be cross-linked by, e.g., a polyamine, polyamide, polythiol, or polyol. The epoxy resin may also be cross-linked by perfluorocyclobutane linkages.

In other embodiments, the polymer is cross-linked with a diisocyanate or a polyisocyanate resin to form a polyurethane. In some embodiments, the polymer may be cross-linked with a diisocyanate selected from the group consisting of methylene-bis-(4-cyclohyxylisocyanate), hexamethylene diisocyanate, diphenylmethane diisocyanate, toluene diisocyanate, and isophorone diisocyanate. In other embodiments, the polymer is cross-linked with a polyisocyanate resin based on a diisocyanate selected from the group consisting of methylene-bis-(4-cyclohexylisocyanate), hexamethylene diisocyanate, diphenylmethane diisocyanate, toluene diisocyanate, and isophorone diisocyanate.

In some embodiments of the present technology, the polymer is a polycarbonate including a plurality of partially hydrogenated bisphenol-A containing units having the formula (II):

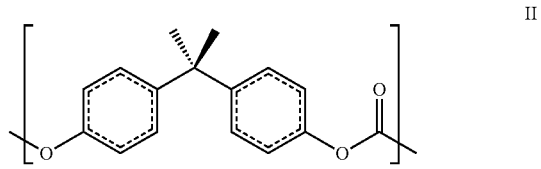

wherein the dashed line indicates the presence of one or two double bonds at any position within each ring. In some embodiments, each ring of the partially hydrogenated bisphenol-A containing unit contains one double bond. In certain embodiments, the number of partially hydrogenated bisphenol-A containing units having the formula (II) range from 2 to about 100,000.

The partially hydrogenated bisphenol-A containing monomers may copolymerize with varieties of aromatic or aliphatic monomers to provide pHBPA-containing polycarbonates. For example, in some embodiments, the polycarbonate further includes a plurality of repeating units having the formula (III):

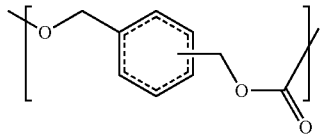

wherein the dashed line indicates the presence of one or two double bonds at any position within the ring. In some embodiments of the polymer, the number of partially hydrogenated bisphenol-A containing units having the formula (II) range from 2 to about 100,000 and the number of repeating units having the formula (III) range from 2 to about 100,000.

In some embodiments, the polycarbonate further includes a plurality of repeating units having the formula (IV):

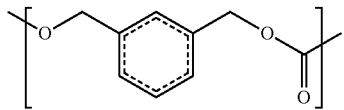

wherein the dashed line indicates the presence of one or two double bonds at any position within the ring. In some embodiments of the polymer, the number of partially hydrogenated bisphenol-A containing units having the formula (II) range from 2 to about 100,000 and the number of repeating units having the formula (IV) range from 2 to about 100,000.

In some embodiments the polycarbonate further includes a plurality of repeating units having the formula (V):

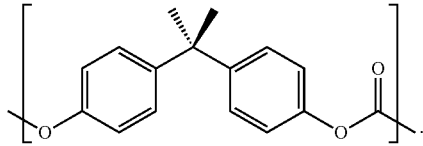

In some embodiments the polycarbonate has the formula (VI):

In some embodiments the polymer is an alkyd resin including a polyol backbone, wherein the polyol backbone includes a plurality of partially hydrogenated bisphenol-A containing units; and a plurality of fatty acid side chain units attached to the backbone. In an illustrative embodiment, the partially hydrogenated bisphenol-A containing unit has the formula (I):

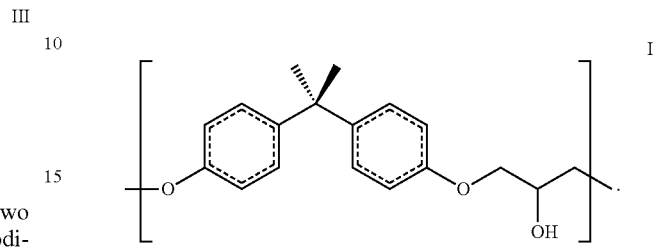

In some embodiments, the fatty acid side chain units include one or more of oleic acid, linolenic acid, linoleic acid, eleostearic acid, or palmitic acid. In some embodiments, the fatty acid side chain units include from about 80 to about 85% of eleostearic acid, from about 2 to about 6% of oleic acid, from about 3 to about 7% of palmitic acid, and from about 5 to about 10% of linoleic acid.

In some embodiments the polymer is a polyester including a plurality of partially hydrogenated bisphenol-A containing units, a plurality of dicarboxylic acid units, and optionally, a plurality of aliphatic or aromatic polyol units different from the partially hydrogenated bisphenol-A containing units. Representative dicarboxylic acid units are derived from monomers selected from the group consisting of cyclohexane-1,4-dicarboxylic acid, cyclohexane-1,2-dicarboxylic acid, cyclohexane-1,3-dicarboxylic acid, cyclobutane-1,2-dicarboxylic acid, cyclobutante-1,3-dicarboxylic acid, adipic acid, sebacic acid, isophthalic acid, perhydrophthalic acid, terephthalic acid, phthalic acid, and a mixture of any two or more thereof. Representative aliphatic polyol units are derived from monomers selected from the group consisting of trimethylolpropane, ethylene glycol, propylene glycol, neopentyl glycol, pentaerythritol, 1,6-hexanediol, 1,4-butanediol, cyclohexanedimethanol, and a mixture of any two or more thereof. Representative aromatic polyol units are derived from monomers selected from the group consisting of bisphenol-A, bisphenol-F, dihydroxybenzene, dihydroxybiphenyl, benzenedimethanol, dihydroxytoluene, and dihydroxyxylene. The polyester may be cross-linked by, e.g., a melamine formaldehyde resin. In some embodiments, the polyester has a weight average molecular weight of from about 700 to about 1,000,000 Daltons.

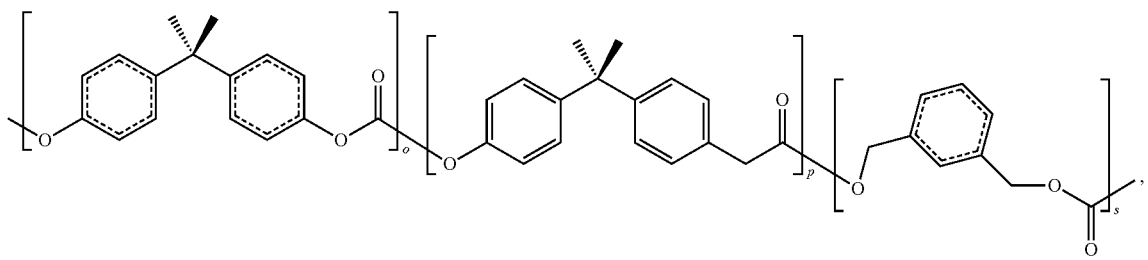

wherein q, r, and s are independently 2 to 100,000.

In some embodiments of the present technology, the polymer is a graft copolymer including a backbone and graft sidechains, wherein the backbone of the copolymer includes at least one repeating unit selected from the group consisting of pHBPA and pHBPA-epichlorohydrin, and the graft side chains may be a polymer including one or more types of monomers selected from the group consisting of acrylics, styrenics (including but not limited to styrene), vinyl acetate, vinyl chloride, and alcohols. In an illustrative embodiment, the backbone copolymer includes a plurality of repeating units having the formula (I):

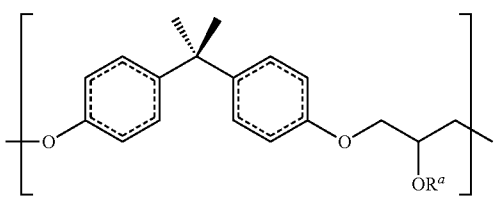

wherein each $R^a$ is independently H or a polyacrylate side chain, and the dashed line indicates the presence of one or two double bonds at any position within each ring. In some embodiments, the graft side chain is a polyacrylate including at least one repeating unit selected from acrylic acid, acrylic acid esters, methacrylic acid and methacrylic acid esters.

In another aspect, the present technology provides a composition including any of the pHBPA-based polymers described herein, wherein the composition is formulated for coating a food or beverage container or a medical device. In another aspect, there is provided a food or beverage container, including a surface coated at least in part with any of the coating compositions of the present technology. In still another aspect, there is provided a medical device, including a surface coated at least in part with any of the coating compositions of the present technology.

In another aspect, the present technology provides a food or beverage container, including a surface, wherein the surface includes any of the pHBPA-based polymers described herein.

In another aspect, the present technology provides a medical device, including a surface, wherein the surface includes any of the pHBPA-based polymers described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4A shows saturated and FIG. 4B shows unsaturated versions of the representative monomers.

DETAILED DESCRIPTION

Figure 1:
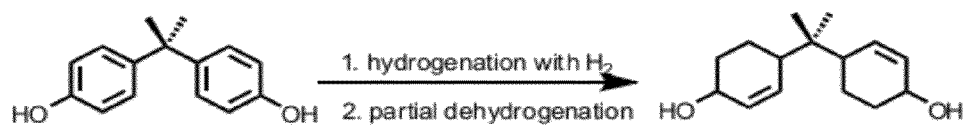
FIG. 1 depicts an illustrative embodiment of the hydrogenation/dehydrogenation of BPA to pHBPA.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Partially hydrogenated bisphenol-A (pHBPA). Bisphenol-A is an aromatic compound. It can be hydrogenated with hydrogen by a variety of methods known in organic chemistry to produce fully hydrogenated bisphenol-A and then partially dehydrogenated to provide the present pHBPA. For example, FIG. 1 shows the hydrogenation of BPA to a representative pHBPA. The first step of hydrogenations may be carried out with hydrogen with or without a catalyst. Representative catalysts include platinum, palladium, rhodium, ruthenium, and nickel based catalyst such as Raney nickel and Urushibara nickel. The second step may be carried out using any standard method using catalysts including but not limited to, iron oxide (600°), rhodium or iridium catalysts bearing, e.g., bisphosphine or bisamine ligands, and the like. Thus, as used herein, the term "partially hydrogenated bisphenol-A" includes any partially unsaturated compound having the bisphenol-A skeleton of carbon and oxygen. pHBPA does not include BPA itself, which is aromatic, or hydrogenated BPA, which is fully saturated.

The present technology provides pHBPA-based polymers as a substitute for BPA-based polymers in consumer products and medical applications. pHBPA-based polymers may be prepared by hydrogenation/dehydrogenation processes of BPA monomers as explained above. The monomers produced can be polymerized into pHBPA-based polymers. The other way is to polymerize the aromatic monomers into aromatic polymers. The aromatic polymers can then be hydrogenated to form aliphatic polymers using hydrogen with or without catalyst. Representative catalysts include platinum, palladium, rhodium, ruthenium, and nickel based catalyst such as Raney nickel and Urushibara nickel. Those of skill in the art may readily select the appropriate methods, taking into account the cost effectiveness and desired structure of the final product(s).

pHBPA-based polymers include at least one repeating unit that is a partially hydrogenated bisphenol A-containing unit. As used herein, the latter units are derived from both pHBPA monomers and the partially hydrogenated products of substituted and unsubstituted BPA (collectively, "HBPA-based monomers"). Substituted BPA is BPA in which one or more hydrogens (e.g., 1, 2, 3, 4, 5, or 6 hydrogens) have been replaced with a non-hydrogen group and/or one or both methyl groups of BPA have been replaced with a non-methyl group (including, but not limited to hydrogen). In some embodiments, the substituents are selected from the group consisting of hydroxyl, halo (e.g., F, Cl, Br, I), alkyl, alkenyl, alkynyl, cycloalkyl, aryl, carboxylate, ether, ester, thioether, thioester, phosphine, alkyl phosphine, aryl phosphine, amine, alkyl amine, and aryl amine. The alkyl, cycloalkyl, and aryl groups may be optionally substituted with hydroxyl or halo groups. In some embodiments, the pHBPA monomer has the formula VIII below:

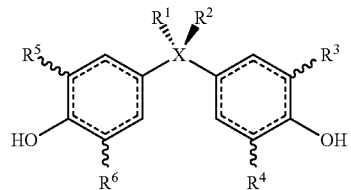

VIII wherein
X is C; and
$R^1$-$R^6$ are independently selected from the group consisting of H, OH, F, Cl, Br, I, alkyl, cycloalkyl, alkenyl, alkynyl, carboxylate, ether, ester, amine, and aryl groups, wherein the alkyl, cycloalkyl, alkenyl, alkynyl, carboxylate, ether, ester, amine, and aryl groups are optionally substituted with one or more substituents selected from the group consisting of OH, F, Cl, Br, and I; or
$R^1$ and $R^2$, together with X, may form a cycloalkyl group, optionally substituted with one or more halo groups.

Figure 2:
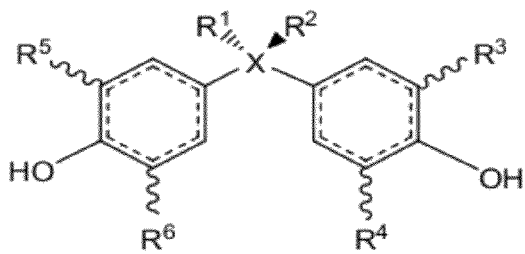
FIG. 2 depicts illustrative embodiments of representative derivatives of pHBPA monomers

FIG. 2 illustrates a number of representative partially hydrogenated BPA monomers having the above formula. In some embodiments, X is C and the $R^1$ and $R^2$ groups are independently selected from $C_{1-10}$ alkyl groups optionally substituted with hydroxyl or one or more F, or phenyl groups. In other embodiments, the $R^3$, $R^4$, $R^5$, and $R^6$ groups are independently selected from $C_{1-6}$ alkyl groups optionally substituted with hydroxyl or one or more F. In still other embodiments, X is C and $R^1$ and $R^2$, together with X, form a $C_{3-6}$ cycloalkyl group.

Figure 3A:
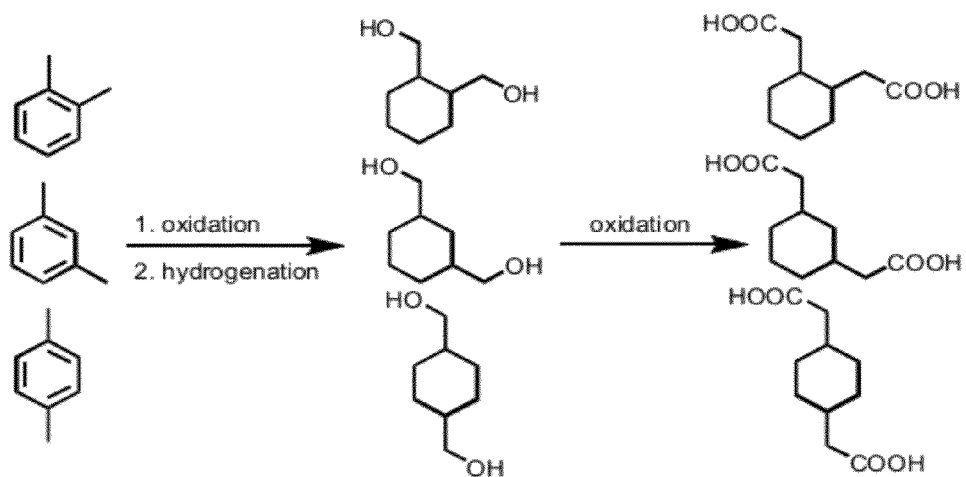
FIGS. 3A and 3B depict illustrative embodiments of representative saturated diols and dicarboxylic acids (3A) and partially unsaturated diols and dicarboxylic acids (3B) for copolymerization with pHBPA monomers including cylcohexane-based diols and dicarboxylic acids, which are derived from the various isomers of xylene.
Figure 3B:
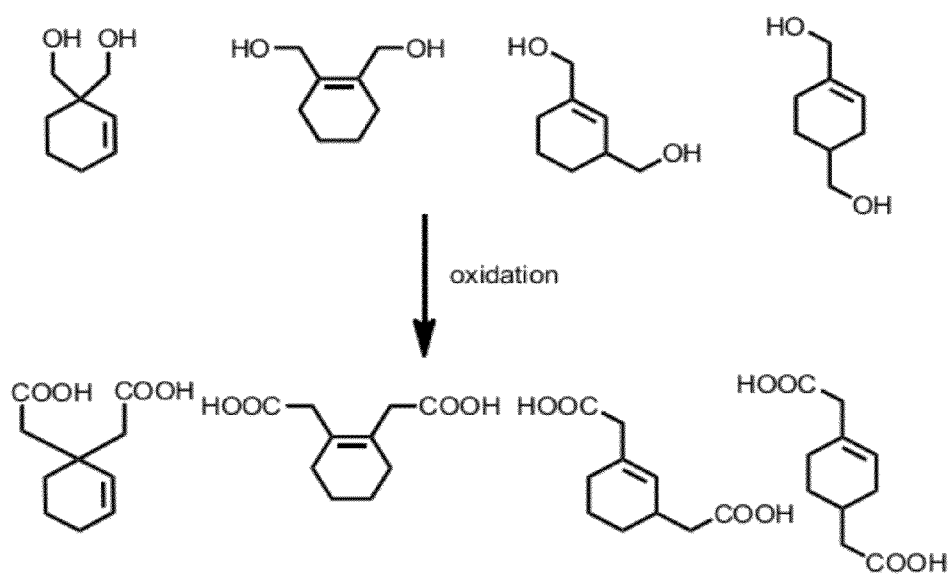
Figure 3C:
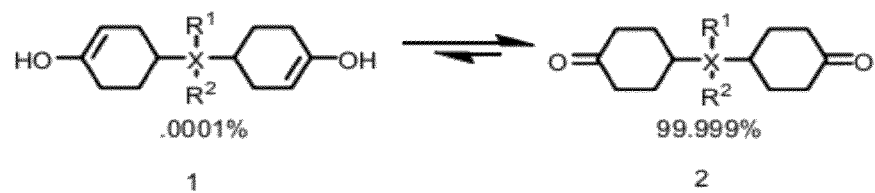
FIGS. 3C and 3D depict illustrative embodiments of enol forms of pHBPA.
Figure 3D:
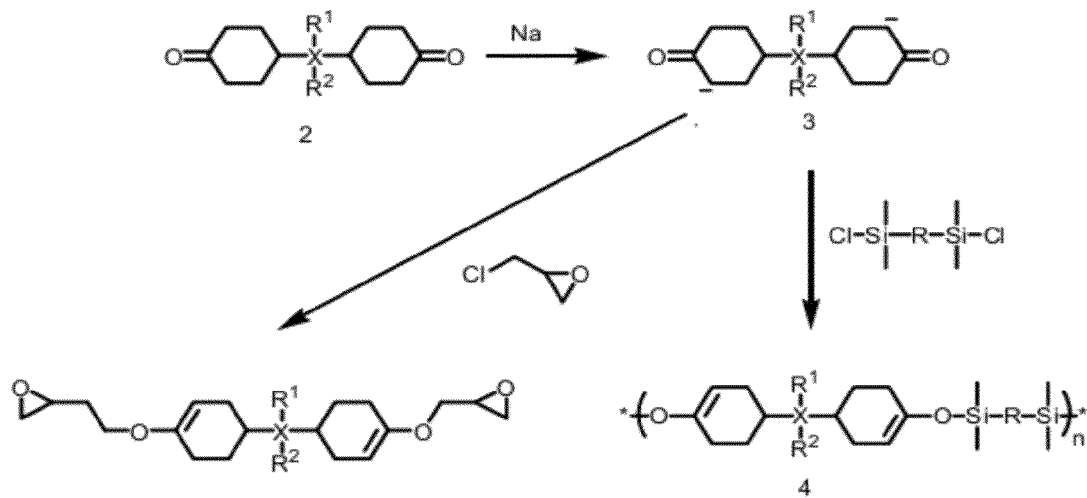

Depending upon the position and the number of double bonds in the benzene ring, pHBPAs may exist in various forms. For example, FIG. 3C shows a schematic illustration of one embodiment of pHBPA (1), which may tautomerize between the enol (1) and keto (2) forms. The enol (1) may be used to provide pHBPA based polymers. Even though the enol form (1) is a less stable form, it is possible to lock the monomer in the enol form using chemical techniques known in the art. For example, FIG. 3D is a scheme showing the capture of an enol form of the pHBPA (1) by formation of the anion (3) using strong base such as NaH. With an electrophilic moiety such as trimethylsilyl chloride or epichlorohydrin, the enol form (4) can be captured. Thus, such electrophiles provide pHBPA monomers for use in polymers of the present technology.

Alkyl groups include straight chain and branched chain alkyl groups having the number of carbons indicated herein. In some embodiments an alkyl group has from 1 to 10 carbon atoms, from 1 to 8 carbons or, in some embodiments, from 1 to 6, or 1, 2, 3, 4 or 5 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups.

Cycloalkyl groups are cyclic alkyl groups having from 3 to 20 carbon atoms. In some embodiments, the cycloalkyl group has 3 to 7 ring carbons, whereas in other embodiments the number of ring carbon atoms range from 3 to 5, 3 to 6, or 5, 6 or 7. Cycloalkyl groups may be monocyclic, bicyclic and polycyclic ring systems. Monocyclic groups include, e.g., cyclopropyl, cyclobutyl, cyclopentyl, cyclohexyl, and cycloheptyl groups. Bicyclic and polycyclic cycloalkyl groups include bridged or fused rings, such as, but not limited to, bicyclo[3.2.1]octane, decalinyl, and the like. Cycloalkyl groups include rings that are substituted with straight or branched chain alkyl groups as defined above.

Aryl groups are aromatic groups having from 6 to 20 carbon atoms. In some embodiments, the aryl group has 6 to 12 ring carbons, whereas in other embodiments the number of ring carbons range from 6 to 10. Aryl groups may be monocyclic, bicyclic, and polycyclic ring systems. Monocyclic groups include, for example, phenyl group. Bicyclic and polycyclic aryl groups include bridged or fused ring, such as, but not limited to, naphthaleny, anthracenyl, phenanthrenyl, and pyrenyl.

Partially hydrogenated BPA monomers may be used alone or copolymerized with other monomers such as other diols and dicarboxylic acids to form pHBPA based polymers. Monomers that can be copolymerized with pHBPA monomers may be other aromatic moieties that are partially hydrogenated to form useful and commercially viable monomer units for polymer production. For example, common diols and dicarboxylic acids can be derived from various forms of xylene. The diols and diacids may be fully saturated (FIG. 3A) or partially saturated (FIG. 3B). These building blocks of polymers (monomers) can be copolymerized with monomers including partially hydrogenated bisphenol-A to form a variety of polymers such as polyesters, polyurethanes, acrylics, and epoxies with properties tuned to specific applications.

Figure 4A:
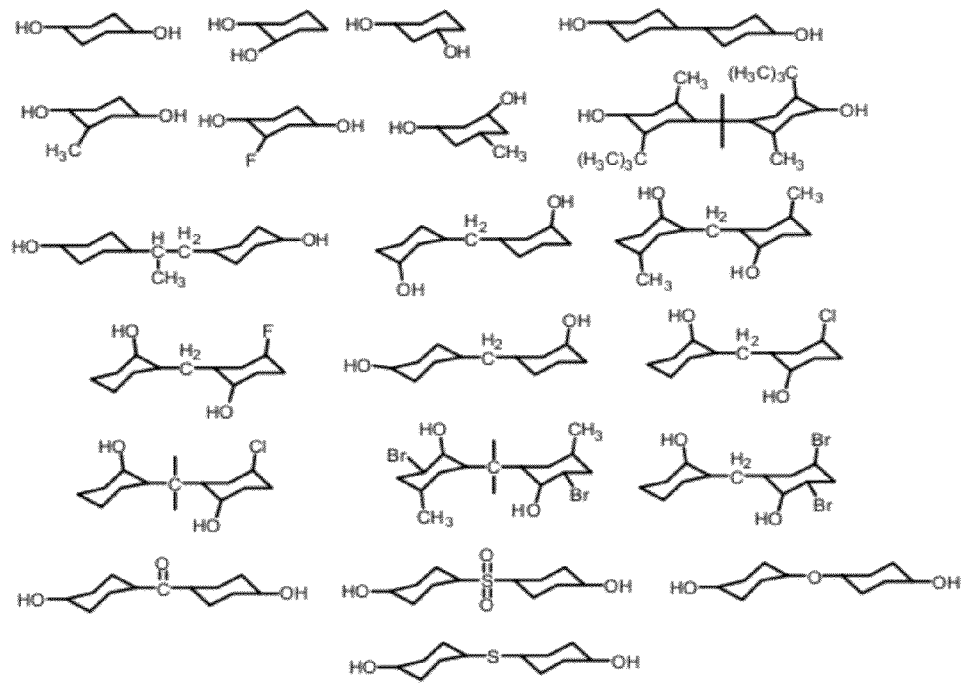
FIGS. 4A and 4B depict illustrative embodiments of representative monomers that can be copolyermized with pHBPA-based monomers.
Figure 4B:
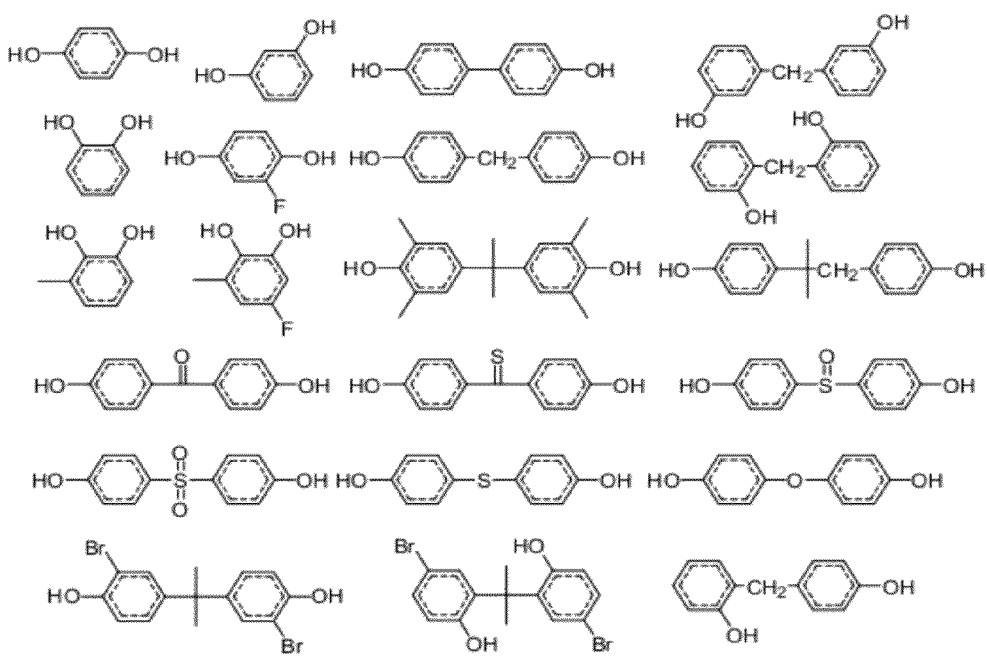

Other monomers, aromatic or aliphatic, may be copolymerized with the partially hydrogenated BPA monomers to provide the desired pHBPA-based polymers. Aromatic monomers may include substituted and unsubstituted BPA. Aliphatic monomers may be obtained from common aromatic moieties by hydrogenation. For example, common diols and dicarboxylic acids can be derived from various forms of xylene, as shown in FIG. 3. FIGS. 4A and 4B illustrate representative monomers (saturated and unsaturated, respectively) that can be copolymerized with partially hydrogenated BPA monomers.

Figure 31:
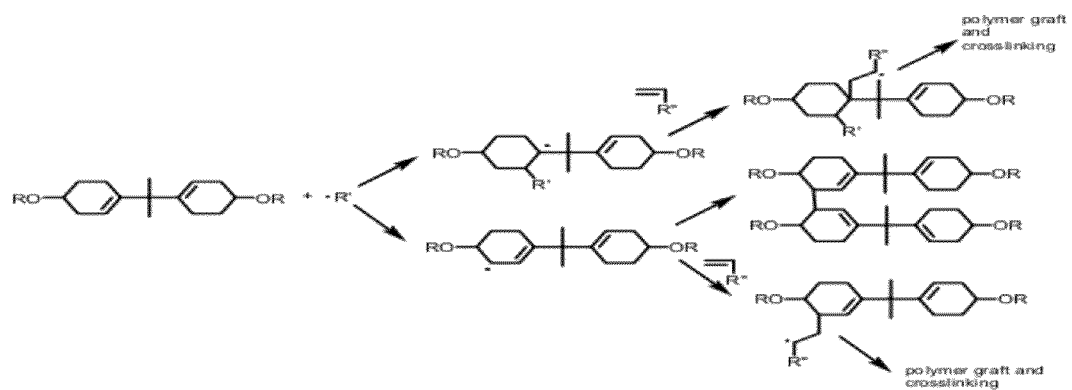
FIG. 31 depicts illustrative embodiments of possible cross-linking of pHBPA-based polymers through the cyclohexenyl olefin.
Figure 32:
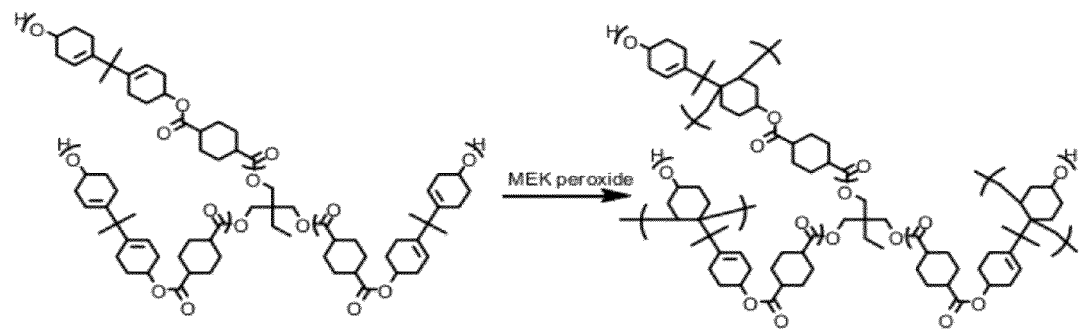
FIG. 32 depicts an illustrative embodiment of a polyester of the present technology cross-linked through the cyclohexenyl olefin, Example 18.
Figure 33:
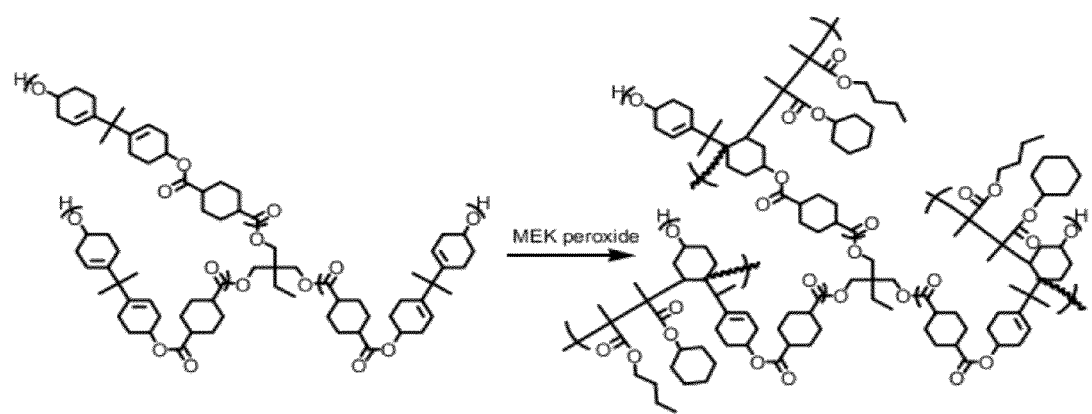
FIG. 33 depicts an illustrative embodiment of the cross-linking of a polyester through the pHBPA and acrylic moieties according to the procedure of Example 19.
Figure 34:
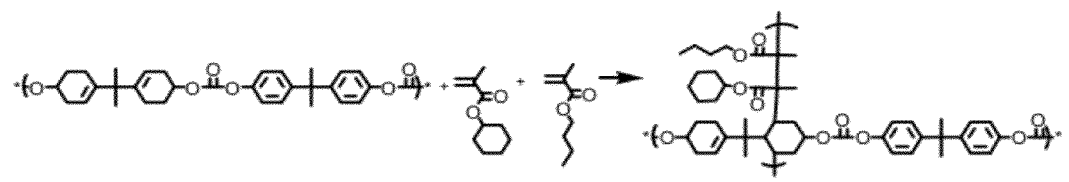
FIG. 34 depicts an illustrative embodiment of the cross-linking of a representative polycarbonate resin through the pHBPA and acrylic moieties as outlined in Example 20.

In addition to specific cross-linkers used with, e.g., epoxies, polyurethanes, and alkyds, as discussed herein, polymers of the present technology may be cross-linked through the cyclohexenyl rings of the pHBPA based repeating units. FIG. 31 is a schematic representation of possible reactions of pHBPA units. (R is the rest of the polymer and R" is the rest of a vinylic monomer or vinylic prepolymer.) A radical source can either add to the double bond or abstract a proton a to the double bond. Thus, cross-linking can take place through vinyl addition at the point of the double bond or at the a carbon, or through coupling of pHBPA rings. Any suitable free radical initiators such as those discussed herein with respect to acrylic graft copolymers may be used.

While not wishing to be bound by theory, it is believed that the low toxicity of pHBPA-based polymers is due to the lower toxicity of pHBPA-based monomers. The difference in toxicity of pHBPA-based monomers compared to BPA-based monomers is likely because of the differences in structure and reactivity of the aliphatic alcohols and carboxylic acids compared to their aromatic counterparts. For example, the phenolic hydroxyl of BPA is much more acidic than aliphatic alcohols. The pKa for BPA is 9.6 while the pKa for pHBPA is about 15-17, depending on the position of the double bond in relation to the hydroxyl group. Not wanting to be limited by the theory, the difference may leads to different metabolic mechanisms for pHBPA and BPA in a biological system, which likely would lead to reduced endocrine disrupting effect for pHBPA when compared to BPA. The higher pKa of hydrogenated BPA monomers also leads to more hydrolytically stable polymers that will not leach monomer units into the contents of food and beverage containers. Thus, pHBPA and other similar cycloaliphatic diols and dicarboxylic acid are much less toxic than BPA, and result in safer, more durable polymers.

Epoxy resins. BPA epoxy resins are often used as the interior linings of cans used for food and beverages. These resin systems have come under increasing scrutiny because BPA can be leached ((a) Munguia-Lopez, E. M.; Peralta, E.; Gonzalez-Leon, Alberto; Vargas-Requena, Claudia; Soto-Valdez, Herlinda. Migration of bisphenol A (BPA) from epoxy can coatings to Jalapeño peppers and an acid food stimulant *Journal of Agricultural and Food Chemistry* (2002), 50(25), 7299; (b) Munguia-Lopez, E. M.; Gerardo-Lugo, S.; Peralta, E.; Bolumen, S.; Soto-Valdez, H. Migration of bisphenol A (BPA) from can coatings into a fatty-food simulant and tuna fish. *Food Additives and Contaminants* (2005), 22(9), 892; (c) Simoneau, C.; Theobald, A.; Hannaert, P.; Roncari, P.; Roncari, A.; Rudolph, T.; Anklam, E. Monitoring of bisphenol-A-diglycidyl-ether (BADGE) in canned fish in oil *Food Additives & Contaminants: Part A* (1999), http://www.informaworld.com/smpp/title~db=all~content=t713599661~tab=issueslist~branches=16-v1616(5), 189; (d) Kawamura, Y.; Sano, H.; Yamada, T. Migration of bisphenol A from can coatings to drinks *Journal of Food Hygiene Society Japan* (1999), 40(158), 165; (e) Cao, X.-L.,; Corriveau, J.; Popovic, S. Levels of Bisphenol A in Canned Soft Drink Products in Canadian Markets *Journal of Agricultural and Food Chemistry* (2009) 57(4), 1307.) into the consumable products and cause a multitude of health concerns. By contrast, pHBPA-based polymers are much more hydrolytically stable ((a) Kim, Kyu-jun; Mochrie, Steve; Yang, Shi, (2004), WO 2004058892; (b) Henson, Walter A.; Helmreich, Robert F.; Johnson, Wilbur E. (1962), U.S. Pat. No. 3,061,559; (c) Hayes, B. T., *SPE Transactions* (1964), 4(2), 90). Thus, less pHBPA will leach into food products, which leads to less toxicity and less endocrine disruptive behavior by BPA. These properties make pHBPA epoxy resins especially suited for interior linings of food and beverage containers and coatings for medical storage devices.

Epoxy resins of the present technology may be prepared analogously to BPA-containing epoxy resins. An polyol is formed from pHBPA-based monomers and is then reacted with epichlorohydrin to impart epoxide functionality to the resin. Epoxy resins of the present technology may be cross-linked through the epoxy moieties. Representative functional groups of cross-linking agents that can react with epoxy groups include, but are not limited to, amines, amides, mercaptans, hydroxyl, and carbocations. In addition epoxy resins (or their polyol counterparts) may be cross-linked by perfluorocyclobutane (PFCB) linkages.

To form the perfluorocyclobutane linkages, the epoxy resin is reacted with 1,2-dibromo-1,1,2,2-tetrafluoroethane and debrominated to form trifluorovinyl ethers on the resin when being subjected to heat (e.g., about 220° C.). See, e.g., Choi, W.-S., Harris, F. W., Polymer (2000) 41(16), 6213. The cross-linked polymers obtained from trifluorovinylethers are hydrolytically stable and extremely solvent resistant. The added fluorine in the polymer lowers the surface energy and increases the hydrophobicity of the polymer. The prepolymers can be dispersed in water to create low VOC coatings. The water evaporates during the cure cycle.

Figure 11:
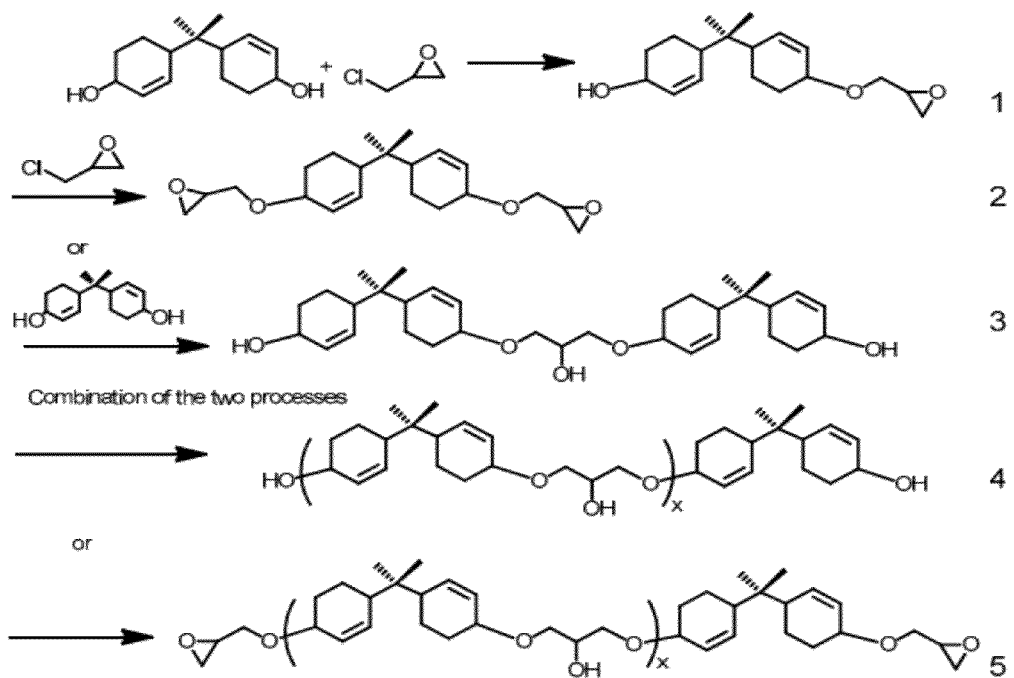
FIG. 11 depicts illustrative embodiments of the reactions of pHBPA with ECH and the resulting structures.

FIG. 11 shows an illustrative embodiment of how pHBPA-based monomers (here pHBPA itself) can react with epichlorohydrin (ECH) to provide diglycidyl ethers, which may be reacted further to provide epoxy polymers. Similar chemistry may be performed using other cycloaliphatic diols. Referring to FIG. 11, pHBPA acts as a nucleophile and opens the epoxy ring to form the initial epoxy substituted pHBPA 1. The reaction may proceed in two pathways. pHBPA 1 can react with ECH to form the bis epoxy adduct of pHBPA, 2. pHBPA 1 can also react with another pHBPA monomer to form a hydroxyl terminated prepolymer 3. Further reactions lead to resins 4, of various molecular weights. As molecular weight increases, so does the chance of side reactions involving the interior hydroxyl moieties, leading to branching. Epoxy resins 5 form in the presence of an excess of ECH. Branching and functionalizing of the interior hydroxyl moieties can also result from structure 5 with higher molecular weights and large excesses of ECH. Resulting epoxy resins of 5 are cross-linkable by a variety of hardeners as noted above.

In some embodiments, the weight average molecular weight of epoxy resins ranges from 300 to 1,000,000 Daltons, from about 300 to about 500 Daltons, from about 500 to about 5,000 Daltons, from about 5,000 to about 15,000 Daltons. In some embodiments, the EEW ranges from about 150 to about 500,000, from about 250 to about 2,500, from about 2,500 to about 8,000.

Graft Copolymer Resins. pHBPA-based grafted polymer resins may be derived from pHBPA and related cycloaliphatic resins. The pHBPA-based grafted polymer resins may be based upon pHBPA-epichlorohydrin epoxy polymers. Alternatively, the terminal moieties may be other moieties such as hydroxyl or hydrogen. In one embodiment, the pHBPA-based grafted polymer resin includes a backbone of pHBPA, pHBPA-epichlorohydrin, or a polymer containing pHBPA with a pendent side chain or graft. The pendent side chain or graft may be derived from vinylic monomers. Representative vinylic monomers include acrylics, styrenics, vinyl carboxylic acids (e.g., vinyl acetate), vinyl chloride, or other vinyl containing monomers.

The pHBPA-based graft copolymer may be emplaced by a free radical initiator such as benzoyl peroxide. Other useful initiators include, but are not limited to, the azo, peroxide, and acyl peroxide initiators known in the art. The pendent side chain or graft may include a variety of monomer moieties. The monomers are chosen to impart desirable properties on the graft copolymer. For example, glassy moieties such as methyl methacrylate or styrene provide hardness to the resulting resin while rubbery moieties such as butyl acrylate provide flexibility. Other monomer moieties such as hydroxyethyl methacrylate provide functionality to cross-link the polymer.

Figure 14:
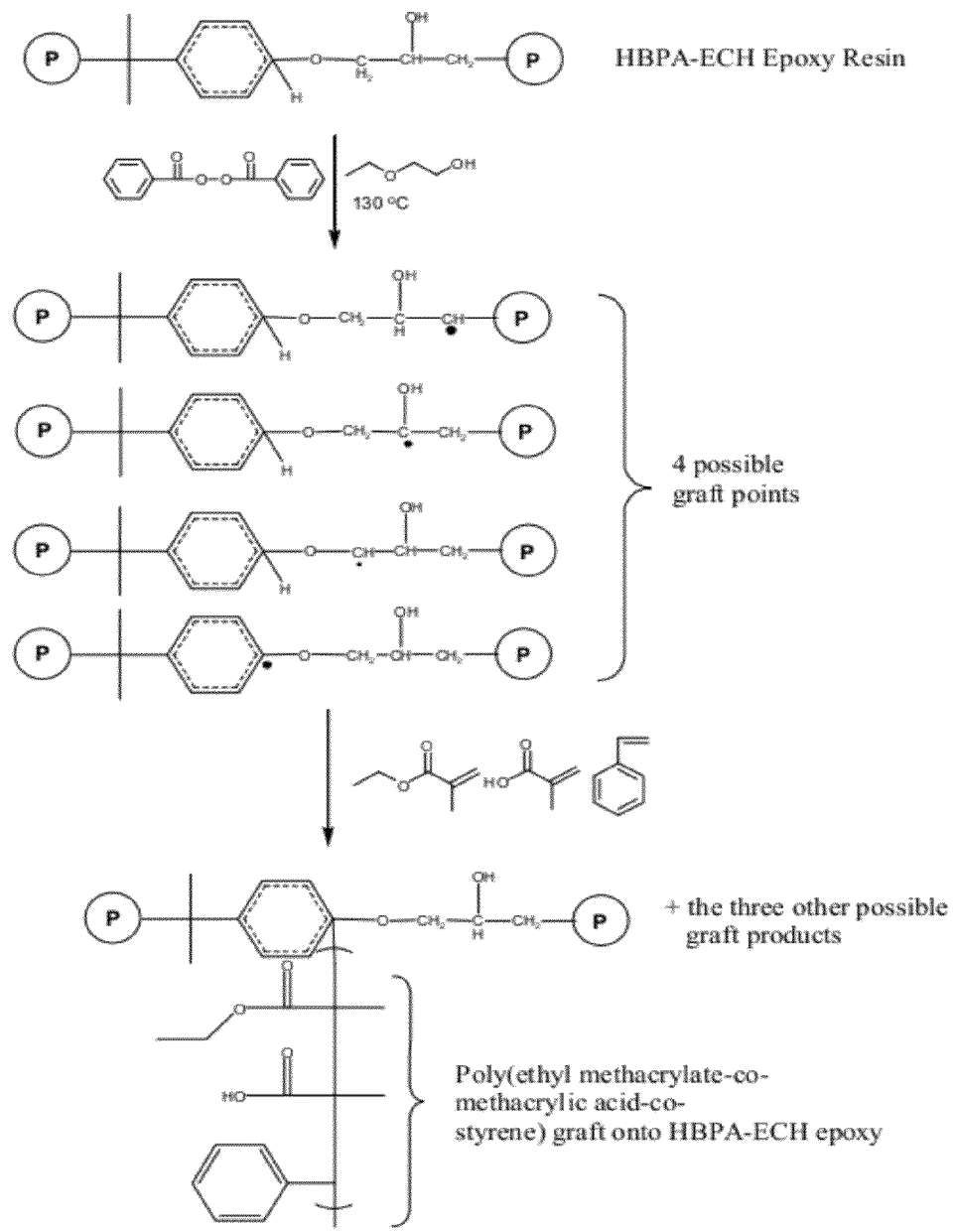
FIG. 14 is a schematic illustration of the placement of a pendent acrylic graft copolymer onto a pHBPA containing backbone.

FIG. 14 shows a schematic of an illustrative embodiment of the placement of a pendent acrylic graft copolymer onto a pHBPA containing backbone. pHBPA-epichlorohydrin (HBPA-ECH) epoxy resin is used as the backbone. There are at least four possible graft points on pHBPA-ECH epoxy backbone, which can lead to at least four possible graft products. (the unsaturated rings of pHBPA provide additional graft points and products.) FIG. 14 shows a representative pHBPA-based graft copolymer, poly(ethyl methacrylate-co-methacrylic acid-co-styrene) grafted pHBPA-ECH epoxy resin (15). Such polymers may be prepared by various methods known in the art. (See, e.g., (a) J. T. K. Woo, V. Ting, J. Evans, R. Marcinko, G. Carlson, C. Ortiz, J. Coat. Technol. (1982) 54, 689. (b) J. T. K. Woo, A. Toman, Polym. Mater. Sci. Eng. (1991) 65, 323.)

Figure 15:
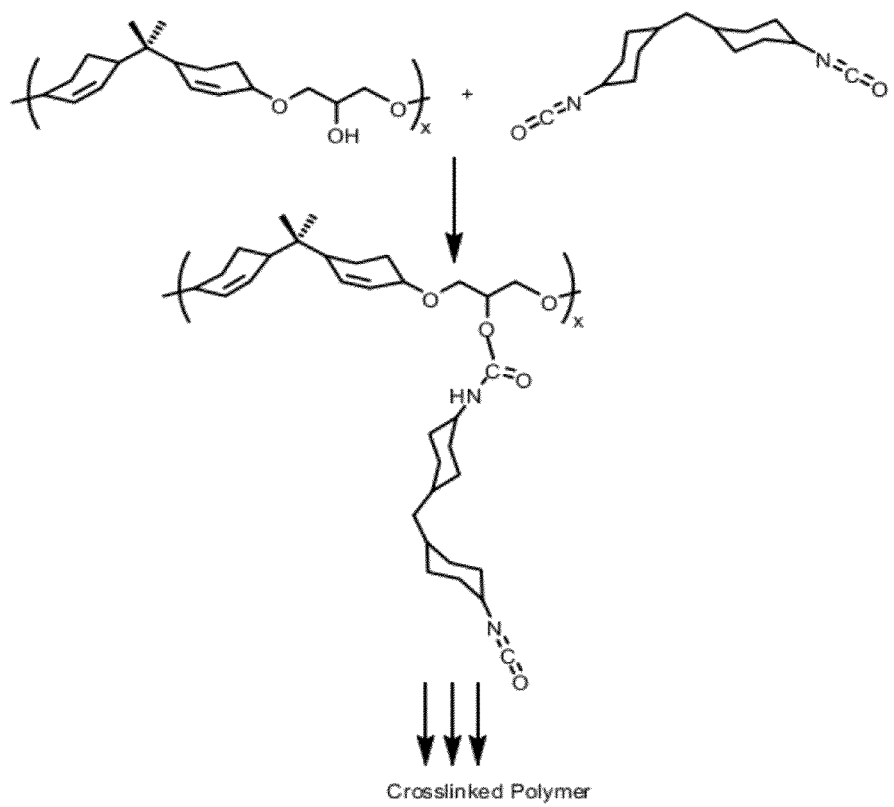
FIG. 15 is a schematic illustration of pHBPA/epichlorohydrin polyol cross-linking with methylene-bis(4-cyclohexylisocyanate).
Figure 16:
FIG. 16 depicts the preparation of representative alkyd resins through fatty acid reaction with polyol.

Polyurethane Coatings. Polyols of pHBPA and epichlorohydrin can be cross-linked with isocyanates to form pHBPA-based polyurethanes. These polyurethanes are hydrolytically stable. FIG. 15 shows an illustrative embodiment of pHBPA/epichlorohydrin polyol cross-linking with methylene-bis(4-cyclohexylisocyanate). To form the pHBPA-based polyurethane coatings, hydroxy-terminated pHBPA-ECH resin may be combined with methylene-bis(4-cyclohexylisocyanate) and diluted with proper solvents, such as methyl acetate, t-butyl acetate, and p-chlorobenzotrifluoride. The solution is applied to substrate surface, such as tin coated steel, and heated to form a cross-linked polyurethane coating.

In another aspect, the present technology provides containers and devices made from pHBPA-based polymers for food, beverage, and medical applications. The pHBPA-based containers have the advantage of being non-endocrine disruptive and less toxic when compared to the BPA-based containers. Representative containers include medical vials, medical vials with attached septum as drug container, medical sample container, "Nalgene" bottles, food containers, baby bottles, beverage container, food storage containers, and plastic cups.

Figure 8:
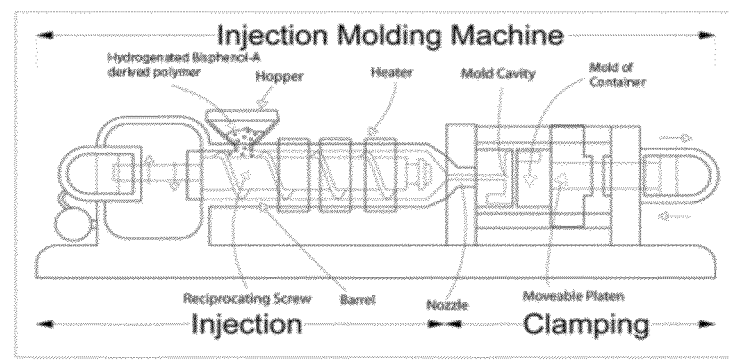
FIG. 8 schematically depicts an illustrative embodiment of the process of molding pHBPA-based polymers into a food and beverage container of the desired shape.

Rigid containers of pHBPA-based polymers may be produced by an injection molding process. FIG. 8 is a schematic illustration of the process of molding pHBPA-based polymers such as, but not limited to, polycarbonates or polyesters into a food and beverage container of the desired shape. In an injection molding machine 100, the pHBPA polymer 110 is added to a hopper 120 where it is carried by a screw 130. During the process, the polymer is heated to the melt temperature of 280° C. by the heater 140. The polymer is then injected into a mold cavity 160 through the nozzle 150. The mold of the container 170 is of the desired shape and size of the container. The formed container is then removed through a moveable platen 180.

Figure 9:
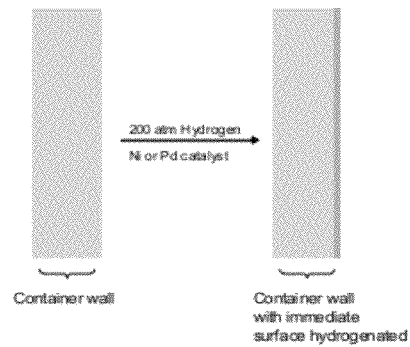
FIG. 9 depicts an illustrative embodiment of a hydrogenation scheme for the surface of a solid BPA-based container.

Alternatively, the pHBPA-based containers may be obtained by hydrogenation of solid containers made of BPA-based containers. In this process, the immediate surface, up to approximately 10 nm depth, of solid containers can be hydrogenated using a finely divided palladium or nickel catalyst, followed by partial dehydrogenation. In one embodiment, as shown in FIG. 9, the container made of or coated by BPA is immersed in a solvent such as hexane in a hydrogenation container. The catalyst is introduced and the container pressurized to 250 atm of hydrogen. The system is heated to 150° C. and agitated for 12 hours resulting in the hydrogenation of the immediate surface of the container. The containers are then washed extensively and the catalyst and solvents are collected to be reused. The dehydrogenation is then carried out with suitable catalysts and temperatures and the containers washed as before.

Figure 5:
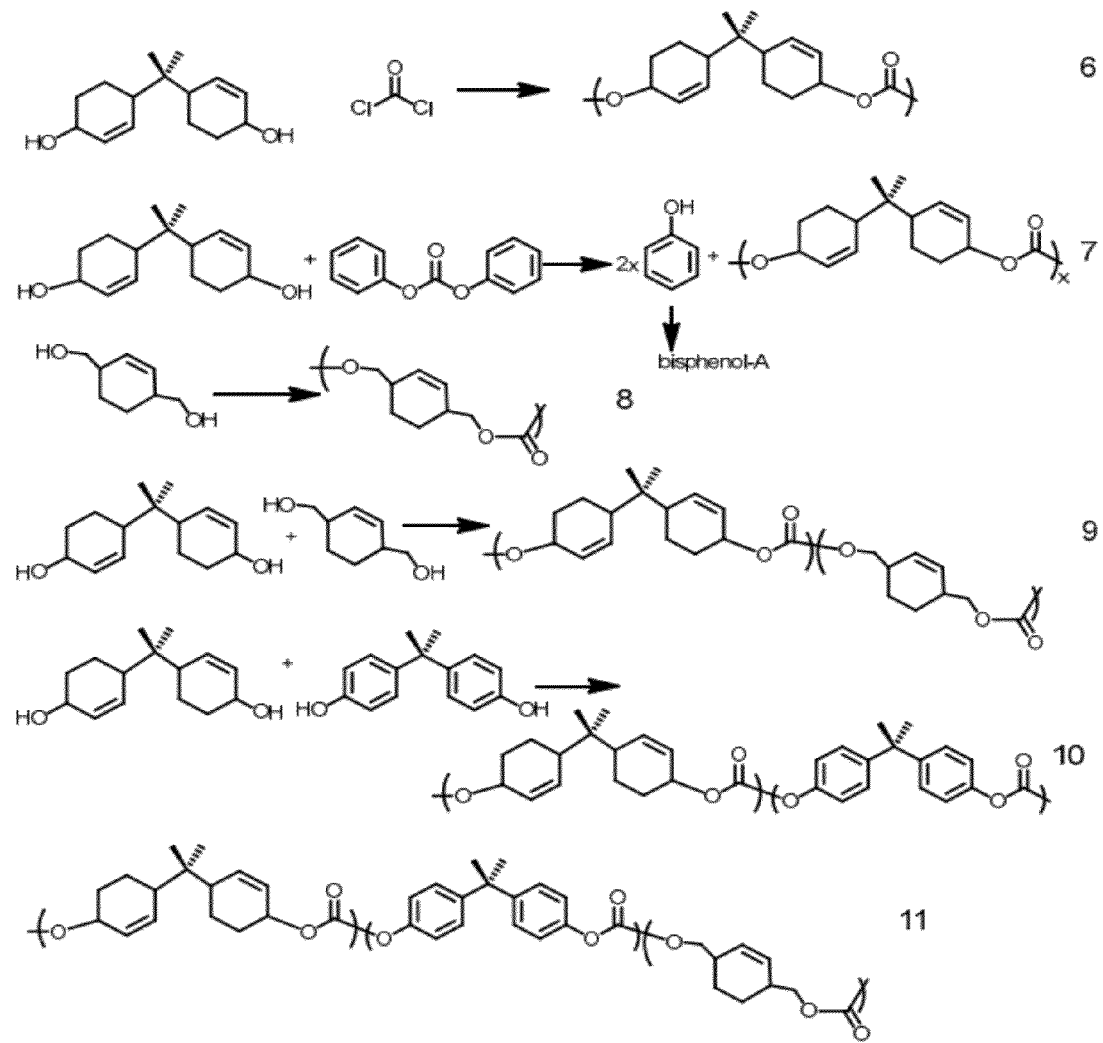
FIG. 5 schematically depicts illustrative embodiments of the synthesis of representative polycarbonates derived from pHBPA-based monomers.

Polycarbonates. Polycarbonates are a class of condensation polymers that include multiple carbonate linkages. Polycarbonates of the present technology may be prepared from pHBPA-based monomers using the same or similar techniques used in producing polycarbonates from BPA. pHBPA-based monomers can be copolymerized with other non-pHBPA-based cycloaliphatic monomers or aromatic monomers to provide polymers having a wide range of properties. For example, a variety of hydrolytically stable polycarbonates may be obtained according to the desired application by changing the types of monomer or the nature of the polymer, such as random or block copolymers. pHBPA-based polymers may also be reinforced with fill materials known in the art such as fibers or inorganic particles if more rigid materials are needed.

pHBPA-based polycarbonates can be synthesized by essentially the same methods as used for production of BPA-based polycarbonates. Thus, pHBPA-based polycarbonates may be prepared via the phosgene route (Goldberg, E. P., (1964) U.S. Pat. No. 3,157,622) or through the transesterification route ((1965), FR 1391473) using diphenyl carbonate (see FIG. 5). Representative pHBPA-based polymers include polycarbonates of pHBPA (6, 7), cylcohexanedimethanol (8), or random and block copolymers of the two (9), as shown in FIG. 5. Polycarbonates may also be prepared from both pHBPA-based monomers and other diols such as those listed in FIG. 4. In one embodiment, cyclohexenyl derivatives can be used to make polycarbonates. Representative partially hydrogenated bisphenol-A based polymers include polycarbonates of pHBPA (6, 7), cylcohexenedimethanol (8), or random and block copolymers of the two (9), as shown in FIG. 5. A wide variety of hydrolytically stable polycarbonates tuned to the desired application is possible by changing the monomers used or making random or block copolymers.

Figure 6:
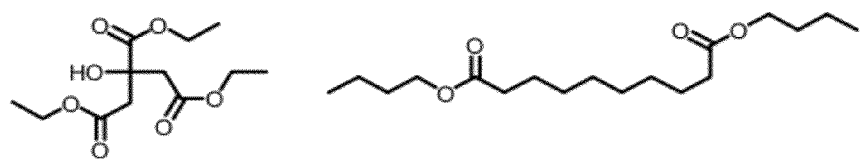
FIG. 6 depicts illustrative embodiments of representative non-toxic plasticizers that may be used to impart increased flexibility to pHBPA polymers. They may be used at a concentration of 0.1-10%.

The pHBPA-based polymers are more flexible than their aromatic counterparts. Thus lower levels of plasticizers are needed to obtain flexible, impact resistant structures. Unlike a BPA polycarbonate that is hard and brittle until plasticized, pHBPA-based polycarbonates are tough, flexible materials even without plasticizers (Schnell, Hermann; Kimpel, Walter; Bottenbruch, Ludwig; Krimm, Heinrich). For example, poly(HBPA) carbonate is a tough rubbery material. Plasticizers may be used to impart additional flexibility and shock resistance to pHBPA-based polycarbonates. FIG. 6 illustrates representative non-toxic plasticizers that may be used to impart increased flexibility to pHBPA-based polymers. The plasticizers are used at a concentration of about 0.1 to about 10 weight percent (wt %) based on the total weight of the composition. In some embodiments, the plasticizer is used at a concentration of about 0.1 to about 5 wt %, about 1 wt % to about 10 wt %, about 1 wt % to about 8 wt %, about 2 to about 5 wt %. The resulting pHBPA-based polymers may be used for flexible containers, bags, and tubing as food and beverage containers or in medical devices.

Partially hydrogenated bisphenol-A forms polymers that are much more hydrolytically stable than similar polymers formed from bisphenol-A. Less pHBPA would migrate into food and drink that is in prolonged contact with related polymer linings and containers. Thus, pHBPA materials are safer in food and medical device related roles. If pHBPA monomer does contaminate food and drink, it poses much less impact on health.

Figure 7:
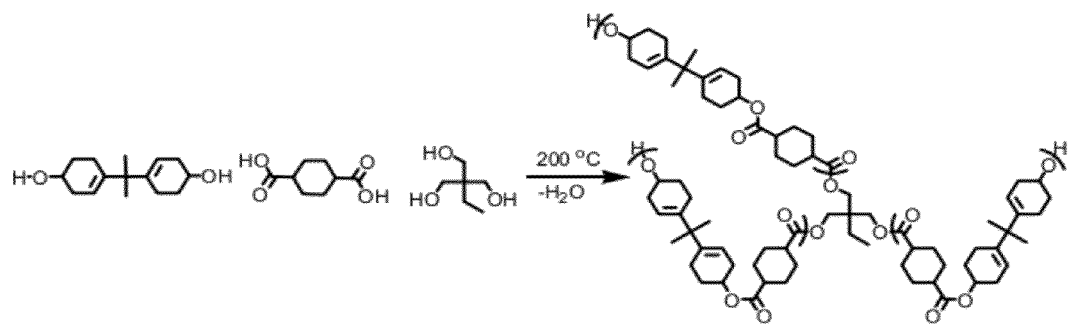
FIG. 7 depicts an illustrative embodiment of the synthesis of a representative polyester of the present technology.

Polyesters. Polyesters are a class of condensation polymers that containing multiple ester linkages. pHBPA-based polyesters may be derived from pHBPA-based monomers. pHBPA-based monomers form polyesters similar to those produced using BPA. pHBPA-based monomers can be copolymerized with other non-pHBPA based cycloaliphatic monomers or aromatic monomers to provide polyesters having desired properties.

pHBPA-based polyesters may be synthesized using esterification techniques known in the organic chemistry art. For example, as shown in FIG. 7, poly(partially hydrogenated 2-methyl-5-tert-butyl-bisphenol-A 1,4-cyclohexyldioate) (14) may be synthesized by polymerizing a pHBPA-based monomer, (12) with 1,4-cyclohexanedioic acid dimethyl ester (13) in the presence of zinc acetate-2-hydrate. Any suitable diols and diacids listed herein may be used.

Depending upon the reaction condition, polyesters having a weight average molecular weight of at least 1000 Daltons, at least 4,000 Daltons, at least 10,000 Daltons, at least 13,000 Daltons or at least 14,000 Daltons may be produced. In some embodiments, the polyester obtained has weight average molecular weight from about 1000 to about 1,000,000 Daltons, from about 10,000 to about 500,000 Daltons, from about 10,000 to about 200,000 Daltons, from about 15,000 to about 100,000 Daltons, from about 15,000 to about 50,000 Daltons, from about 20,000 to about 40,000 Daltons, or from about 29,000 to 31,000 Daltons.

The polyesters according to the present technology can further include a crosslinker A suitable crosslinker can be determined based upon the needs and desires of a user, and can include, for example, aminoplast crosslinkers, phenolic crosslinkers, blocked isocyanates, and 1,3,5-triazine carbamate. Aminoplast crosslinkers can be melamine based, urea based, or benzoguanamine based. Melamine crosslinkers may include commercially available crosslinkers, such as from Cytec Industries, Inc. as CYMEL 303, 1130, 325, 327, and 370. Phenolic crosslinkers may include, for example, novolacs, and resoles; even BPA may be used as a crosslinker. For use on food and beverage containers and medical devices, phenolic crosslinkers that are not derived from bisphenol A are suitable.

In some embodiments, compositions of the present technology (e.g., coating compositions) include greater than 70 wt % of the polyester described herein, wherein wt % is based on the total solids weight of the composition. Typically, the polyester will be present in a range of 70 to 99 wt %, such as 80 to 99 wt %. The crosslinker is typically present in an amount of 1 to 30 wt %, such as 2 to 5 wt %, again with wt % being based on the total solids weight. In certain embodiments, the wt % of crosslinker in the composition is 10 wt % or less, based on total solids weight, such as 5 wt. % or less.

Alkyds. Alkyd resins of the present technology contain fatty acids and either pHBPA-based monomers or a pHBPA-based polymer. The fatty acids may be derived from natural oils such as tall oil, linseed oil, soybean oil, coconut oil, castor oil, sunflower oil, safflower oil, and tung oil, known as "drying oils." Drying oils are popular in the canning business. As an example, tung oil is often used for the lining in olive cans ((a) Pu, Xia; Zhang, Xing-hua, *Linchan Huaxue Yu Gongye* (2006), 26(1), 37; (b) Eisenschiml, Gerald *Paint, Oil and Chemical Review* (1946), 109 (No. 7), 16). Drying oils are long chain fatty acid triglycerides. The fatty acid moieties are separated from the triglyceride by saponification. The fatty acid is then attached to the polyol to form the alkyd.

Figure 12:
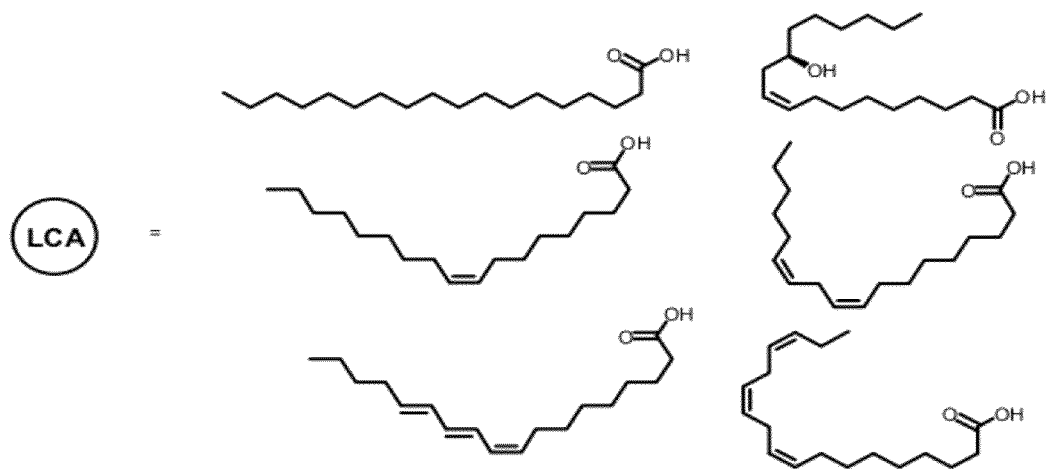
FIG. 12 depicts representative fatty acids useful in creating pHBPA-based alkyd resins.

Depending on the oil type and composition, the saturated fatty acid contents used to produce alkyds may vary in the range of 2.0 to 95.0 wt %, whereas the unsaturated fatty acid contents vary from 10.0 to 98.0 wt %. Preferably the combination of fatty acids used to make the alkyd will have an average number of methylene moieties between double bonds greater than 2.0. In some embodiments, the various oils contain fatty acids having from 8 to 24 carbons, 10 to 20 carbons, or 12 to 18 carbons in their carbon chains. In some embodiments the oils may contain saturated fatty acids with a $C_8$, $C_{10}$, $C_{14}$, $C_{16}$, and/or $C_{18}$ carbon chain. In an illustrative embodiment shown in FIG. 12, the saturated fatty acids content in the oils may be a mixture of lauric, stearic, and/or palmitic acids. In another embodiment, the unsaturated fatty acids in the oils may include oleic acid, linoleic, linolenic, ricinoleic, and/or eleostearic acids.

Fatty acids processed from the oil can be esterified with polyols to form alkyds. The fatty acids may be saturated or un-saturated. The saturated fatty acids such as stearic acid are inert and act as plasticizers in the final polymer product. The unsaturated fatty acids such as oleic acid, linoleic acid, and linolenic acid provide a cross-linking mechanism to form high molecular weight thermosetting resins. The unsaturated fatty acids provide a different degree of reactivity and cross-linking ability and are mixed in various ratios to tailor the properties of the cross-linked coating. Oleic acid leads to alkyds that have a low cross-link density while linolenic leads to alkyds that have a high cross-link density.

The cross-linking process for alkyds is known as "drying". Drying agents, which often are metal complexes, are added to accelerate the drying process. Metals that may be used in the drying agents include but are not limited to cobalt, zirconium, zinc, calcium, and iron, depending upon the oil choice. Most driers are colorless but cobalt is a deep blue purple color and iron driers are reddish orange.

The polyol component of the alkyd resin includes pHBPA-based monomers and polymers. The polyol component of the alky resin may also include glycidyl ethers of pHBPA and related cycloaliphatics. Alkyds are particularly useful for water-based emulsion systems as the alkyd resins are easily dispersed in emulsion form and water does not interfere with the polymerization mechanism. They can also be made into high solids and even solvent free systems. Thus, low to zero VOC coating systems that are low in toxicity can be made using alkyd-based cycloaliphatic polymers.

Figure 13:
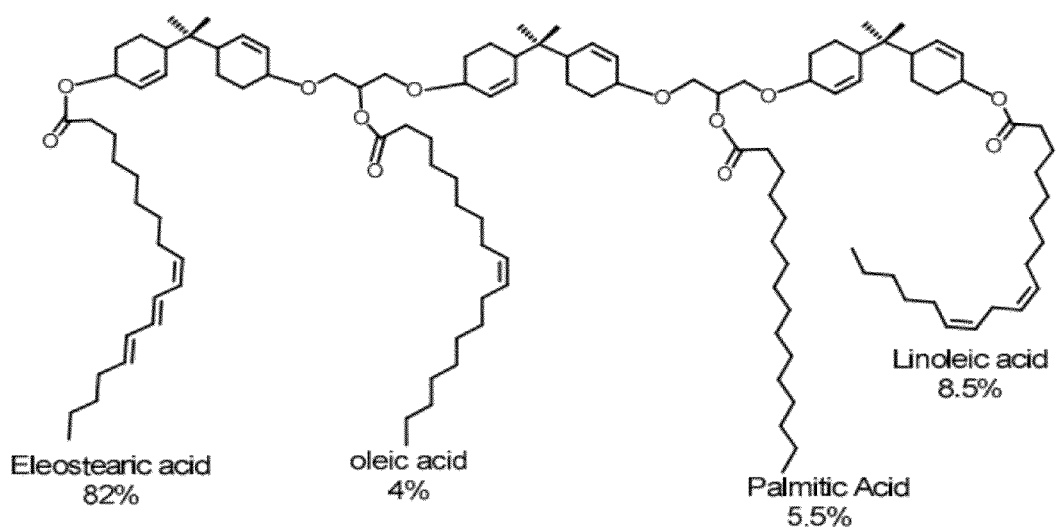
FIG. 13 depicts an illustrative embodiment of a representative pHBPA-based alkyd suitable for can coatings formed from tung oil and a hydroxyl polymer-based upon pHBPA-epichlorohydrin prepolymer.

In some embodiments, from 5 wt % to 75 wt % of tung oil, from 5 wt % to 75 wt % of linseed oil, or from 5 wt % to 75 wt % of castor oil is reacted with the polyol component to provide alkyd resins of the present technology. FIG. 13 shows a representative alkyd of the present technology suitable for can coatings. The alkyd of FIG. 13 is formed from tung oil and a polyol based upon pHBPA-epichlorohydrin prepolymer. In some embodiments, the amount of fatty acid sidechain units of the alkyd range from about 80 to about 85% of eleostearic acid, from about 2 to about 6% of oleic acid, from about 3 to about 7% of palmitic acid, and from about 5 to about 10% of linoleic acid by total weight of the sidechains. Hydroxyl functional polyesters based upon pHBPA and other cycloaliphatics may also be used. Such a resin has a high cross-link density due to the high concentration of eleostearic acid. In some embodiments, the weight average molecular weight of alkyd resins ranges from 700 to 1,000,000 Daltons, from about 700 to about 100,000 Daltons and from about 700 to about 10,000 Daltons.

Containers and Medical Devices. In another aspect, the present technology provides containers and devices made from pHBPA-based polymers for food, beverage, and medical applications. The pHBPA-based containers have the advantage of being non-endocrine disruptive and less toxic when compared to the BPA-based containers. Representative containers include medical vials, medical vials with attached septum as drug container, medical sample container, "Nalgene" bottles, food containers, baby bottles, beverage container, food storage containers, and plastic cups.

Rigid containers of pHBPA-based polymers may be produced by an injection molding process. FIG. 8 is a schematic illustration of the process of molding pHBPA-based polycarbonates or polyesters into a food and beverage container of the desired shape. In an injection molding machine 100, the pHBPA polymer 110 is added to a hopper 120 where it is carried by a screw 130. During the process, the polymer is heated to the melt temperature of 280° C. by the heater 140. The polymer is then injected into a mold cavity 160 through the nozzle 150. The mold of the container 170 is of the desired shape and size of the container. The formed container is then removed through a moveable platen 180.

Alternatively, the pHBPA-based containers may be obtained by hydrogenation of solid containers made of BPA-based containers. In this process, the immediate surface, up to approximately 10 nm depth, of solid containers can be hydrogenated using a finely divided palladium or nickel catalyst. In one embodiment, as shown in FIG. 9, the container made of or coated by BPA is immersed in a solvent such as hexane in a hydrogenation container. The catalyst is introduced and the container pressurized to 250 atm of hydrogen. The system is heated to 150° C. and agitated for 12 hours resulting in the hydrogenation of the immediate surface of the container. The containers are then washed extensively and the catalyst and solvents are collected to be reused.

Coating Compositions. In a further aspect, the present technology provides coating compositions for food and beverage containers and medical storage devices, including pHBPA-based polymers. Representative pHBPA-based polymers useful in the coating composition include epoxy resins, alkyd resins, water reducible graft copolymer coatings, and polyurethane coatings.

The compositions for the interior coating or lining of food and beverage containers may be dependent upon the food or beverage to be packaged in the container. According to the desirable property of a coating, the properties of pHBPA-based polymers may be adjusted by using various known comonomers, either aliphatic or aromatic, and therefore may be used to substitute the BPA-based polymers in current coating processes.

The food or beverage is usually pasteurized at temperatures up to 120° C. for up to 60 minutes (potentially harsh conditions, especially when the food is acidic). Under these conditions, many BPA-based polymers can partially hydrolyze leading to leaching of BPA into the food or beverage contents. The pHBPA-based polymers provide the advantage of high stability and low toxicity when compared to the traditional BPA-based materials used in the industry.

There are several polymer properties to consider in the design of interior coatings for beverage and food containers. Three very important properties are glass transition temperature, hydrolytic stability, and cross-link density. Aromatic moieties are used because they are rigid and lead to polymers with a high glass transition temperature. The high glass temperatures leads to the use of plasticizers to soften polymers made with aromatic moieties to make them more ductile and impart impact resistance. Straight chain aliphatic polymers typically have low glass transition temperatures and often do not require the use of plasticizers. The cycloaliphatic polymers, such as those made from pHBPA, are in between the two extremes. The cyclic moiety imparts rigidity by the aliphatic nature of the ring allowing for increased molecular motion. Thus, while the cycloaliphatic polymers have lower glass transition temperatures than their aromatic counterparts, the glass transition temperature of the cycloaliphatics is substantially higher than the straight chain aliphatic polymers. Thus, pHBPA-based cycloaliphatic polymers are more flexible and have greater impact resistance without (or with reduced) use of plasticizers than similar compositions utilizing aromatic moieties.

Hydrolytic stability is a very important property for interior can coatings as the polymers are subject to aqueous environments at elevated temperatures for extended amounts of time. The issue of hydrolytic stability is one of great importance for BPA polycarbonates. Polycarbonate decomposes to BPA and carbon dioxide with repeated exposure to steam which in turn leads to a loss in polymer properties ((a) Pryde, C. A.; Kelleher, P. G.; Hellman, M. Y., (1982) *Polym. Eng. Sci.* 22, 370.; (b) Hong, K. Z.; Qin, C.; Woo, L. (1996) *Med. Plast. Biomat.* May issue; (c) Asplund, B.; Sperens, J.; Mathisen, T.; Hilborn, J. (2006) *J. Biomater. Sci.*, Poly. Ed. 17(6), 615; (d) Bair, H. E.; Falcone, D. R.; Hellman, M. Y.; Johnson, G. E.; Kelleher, P. G. (1981) *J. App. Poly. Sci.* 26(6), 1777). When polymers containing BPA are heated in a water environment, the monomer is ultimately released into the environment. The reason for this can be explained by the example of phenolic esters, which are structurally similar to carbonates. Esters formed with phenol (phenolic esters) are typically not hydrolytically stable due to specific chemical properties. The same phenomenon can be observed for phenyl methacrylate (a phenolic ester-based polymer). It is for this reason that, in the synthesis of polyesters, aromatic diacids are used with aliphatic alcohols and not the other way around.

The hydrolytic stability of a polymer can be estimated by Newman's "rule of six" steric factor (Equation 1). Specifically, the hydrolytic stability of polymer can be estimated by the number of atoms in the 6-position and then number of atoms in the 7-position. The higher the steric factor, the more hydrolytically stable the polymer would expect to be (Turpin, E. T. (1975) *J. Paint. Technol.* 47(602), 40).

Steric factor=4(# of atoms in the six position)+(# of atoms in the 7 position)     Equation 1

Figure 10:
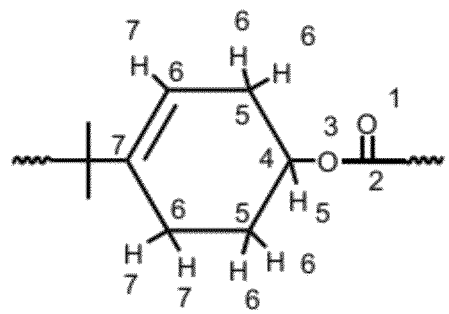
FIG. 10 shows the calculations of the steric factor for hydrolytic stability of pHBPA, neopentyl glycol, BPA, and ethylene glycol.
Figure 10:
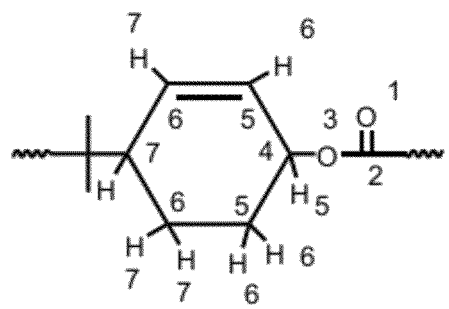
Figure 10:
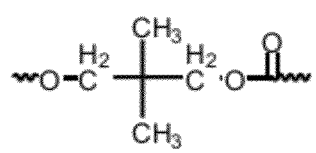
Figure 10:
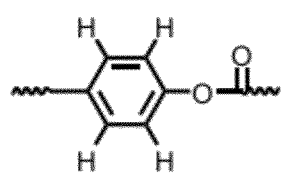
Figure 10:
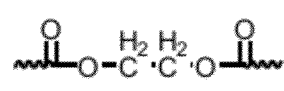

FIG. 10 shows calculation for two isomers of pHBPA, neopentylglycol, BPA, and ethylene glycol as an example. The Newman calculation in FIG. 10 predicts that pHBPA-based polymers formed would be more hydrolytically stable than BPA-based polymers. Thus, polymers based upon the cycloaliphatics, such as pHBPA, should leach less monomer into the food medium. Therefore, toxicity of the polymers based upon the cycloaliphatics is reduced by lowering the amount of monomer contaminates in the food and reduced toxicity in the monomers themselves.

Cross-link density is important to the physical properties of the coatings. The cross-link density greatly impacts the solvent resistance, flexibility, hardness, and other properties of coatings. The property requirements for a specific use determine the right balance between all the properties in a polymer. Flexibility and hydrolysis resistance are two important properties for interior linings. Increased cross-link density often leads to increased resistance to solvents and hydrolysis but also leads to a decrease in flexibility.

The compositions according to the present technology may also include a solvent. Suitable solvents include water, esters, glycol ethers, glycols, ketones, aromatic and aliphatic hydrocarbons, alcohols and the like. Particularly suitable are xylenes, propyleneglycol monomethyl acetates, and dibasic ester such as dimethyl esters of adipic, glutaric and succinic acids. In some embodiments, the compositions are prepared so as to be between about 30 and 60 weight percent solids. Alternatively, the compositions can be aqueous. As used herein, "aqueous" means 50% or greater of the non-solid component of the coating is water. Thus it will be understood that the non-solid component of the compositions can include up to 50% solvent and still be "aqueous".

The compositions of the present technology can also contain any other conventional additives such as pigments, colorants, waxes, lubricants, defoamers, wetting agents, plasticizers, fortifiers and catalysts. Any mineral or sulfonic acid catalyst can be used. Particularly suitable for food can applications are phosphoric acid and dodecyl benzene sulfonic acid.

The coating compositions described above can be applied to a food can by any means known in the art such as hot melt extrusion, roll coating, spraying, and/or electrocoating. It will be appreciated that for two-piece food or beverage containers, the coating may be sprayed after the can is made. For three-piece food or beverage containers, on the other hand, a coil or sheet will typically be roll coated with one or more of the present compositions first and then the can will be formed. The coating is applied to at least part of the interior of the can, but can also be applied to at least part of the exterior of the can. For can end stock, a coil or sheet will typically be roll coated with one of the present compositions; the coating is then cured and the ends are stamped out and fabricated into the finished product.

After application, the coating is then cured. Cure is affected by methods standard in the art. For coil coating, this is typically a short dwell time (i.e. 9 seconds to 2 minutes) at high heat (i.e. 485° F. peak metal temperature); for coated metal sheets cure is typically longer (i.e. 10 minutes) but at lower temperatures (i.e. 400° F. peak metal temperature).

Any materials used for the formation of food or beverage containers can be treated according to the present methods. Particularly suitable substrates include chrome treated aluminum, zirconium treated aluminum, tin-plated steel, tin-free steel, and black-plated steel.

In certain embodiments, the coatings of the present technology can be applied directly to the metal, without any pretreatment or adhesive aid being added to the metal first. In certain other embodiments, such as when making can ends, pretreated aluminum may be desirable. In addition, no coatings need to be applied over top of the coatings used in the present methods. In certain embodiments, the coatings described herein are the last coating applied to the food can.

EXAMPLES

The present technology is further illustrated by the following examples, which should not be construed as limiting in any way.

Example 1

Synthesis of a Representative pHBPA glycidyl ether

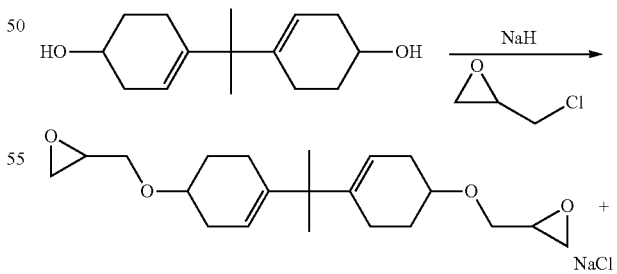

pHBPA can react with epichlorohydrin to form the glycidyl ether of pHBPA. pHBPA, 118 g, 0.50 mol, is added to a flamed-dried 1 L round bottom flask equipped with a stir bar and fitted with a condenser and a nitrogen inlet. To the flask is added 250 mL of dry tetrahydrofuran and cooled to 0° C. on an ice bath. Sodium hydride (60% paste in mineral oil, 88 g, 2.10 mol) is added to the tetrahydrofuran solution. To the pHBPA is added 96 g (1.05 mol) of epichlorohydrin. The solution is allowed to mix for 2 hours. A white precipitate forms. The solution is filtered and the solvents are removed by rotary vacuum yielding a thick liquid. The liquid is purified by column chromatography using ethyl acetate/hexanes on silica.

Example 2

Synthesis of a Representative pHBPA/epichlorohydrin polyol

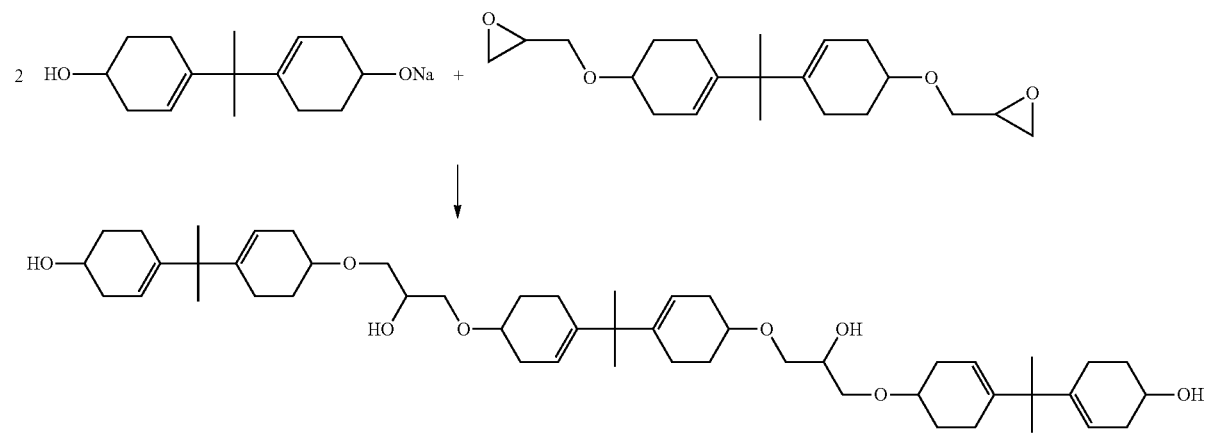

Under dry nitrogen, pHBPA (23.6 g, 0.1 mol) is dissolved into 11.0 mL triethylamine and 50.0 mL of dry tetrahydrofuran. A solution of 17.4 g (0.05 mol) pHBPA glycidyl ether in 35 mL of dry THF under nitrogen is added dropwise over 5 minutes to the pHBPA solution. The two are allowed to stir for 2 hours and then water is added. The solids are extracted using methylene chloride, dried over MgSO$_4$, and the solvent removed by rotary evaporation. Hydroxyl equivalent weight measured to be 215.

Example 3

Figure 17:
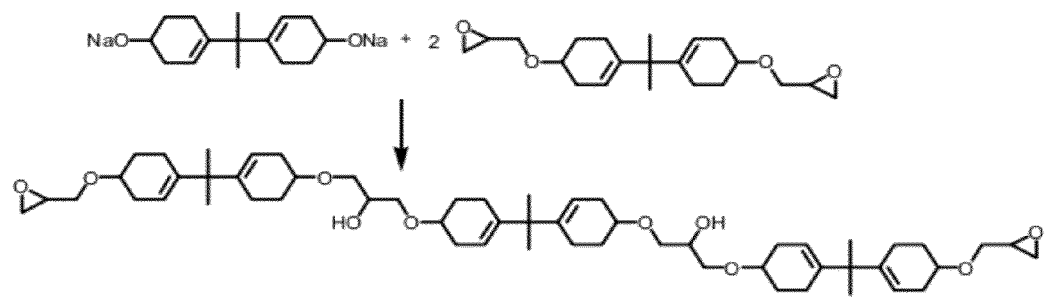
FIG. 17 depicts a schematic illustration of the synthesis of a representative pHBPA glycidyl ether from Example 3.

Synthesis of a Representative pHBPA glycidyl ether pHBPA, 20.0 g, 0.085 mol, is added to a 1 L round bottom flask that is flamed dried with a stir bar, fitted with a condenser and a nitrogen inlet. To the flask is added 100 mL of dry tetrahydrofuran and cooled to 0° C. on an ice bath. Sodium hydride (60% paste in mineral oil, 7.4 g, 0.18 mol) is added to the tetrahydrofuran solution. To the pHBPA is added 61.1 g (0.18 mol) of pHBPA diglycidyl ether in 100 mL of dry THF rapidly with vigorous stirring. The solution is allowed to mix for 20 minutes and water is then added. The solution is filtered and the solvents remove by rotary vacuum yielding a thick liquid. Water is added and the solids extracted with methylene chloride and dried with MgSO$_4$. Methylene chloride is then removed by rotary evaporation. The principal component is shown in FIG. 17; however, unreacted pHBPA diglycidyl ether and larger entities containing 3 and 4 glycidyl moieties are present. Epoxy equivalent weight of the resin is 441.

Example 4

Figure 18:
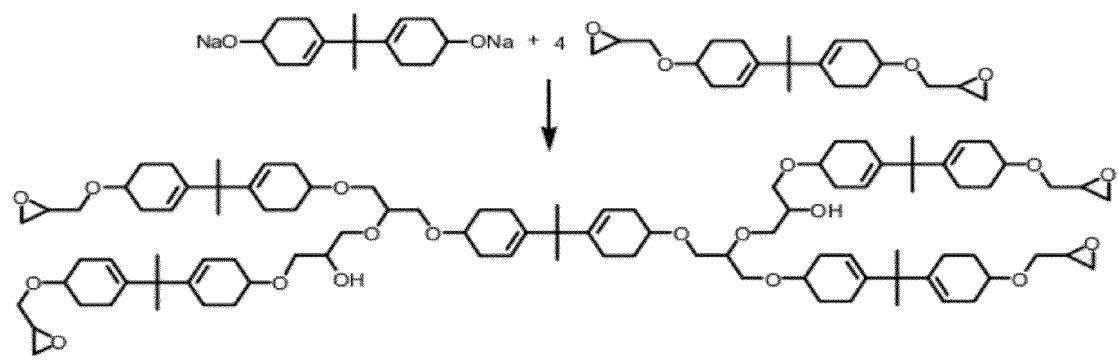
FIG. 18 depicts a schematic illustration of the synthesis of a representative structure of a glycidyl functional pHBPA-epichlorohydrin epoxy resin from Example 4.

Synthesis of a Representative pHBPA glycidyl ether of Higher Molecular Weight pHBPA, 22.1 g, 0.094 mol, is added to a flame-dried 1 L round bottom flask equipped with a stir bar and fitted with a condenser and a nitrogen inlet. To the flask is added 140 mL of dry tetrahydrofuran and cooled to 0° C. on an ice bath. Sodium hydride (60% paste in mineral oil, 8.0 g, 0.2 mol) is added to the tetrahydrofuran solution. To the pHBPA is added 132.3 g (0.380 mol) of pHBPA diglycidyl ether in 200 mL of dry THF rapidly with vigorous stirring. The solution is allowed to mix for 20 minutes and water is then added. The solution is filtered and the solvents remove by rotary vacuum yielding a thick liquid. Water is added and the solids extracted with methylene chloride and dried with MgSO$_4$. Methylene chloride is then removed by rotary evaporation. An idealized structure is shown in FIG. 18; however, unreacted pHBPA diglycidyl ether and larger entities containing 6 to 10 glycidyl moieties are present.

Example 5

Figure 19:
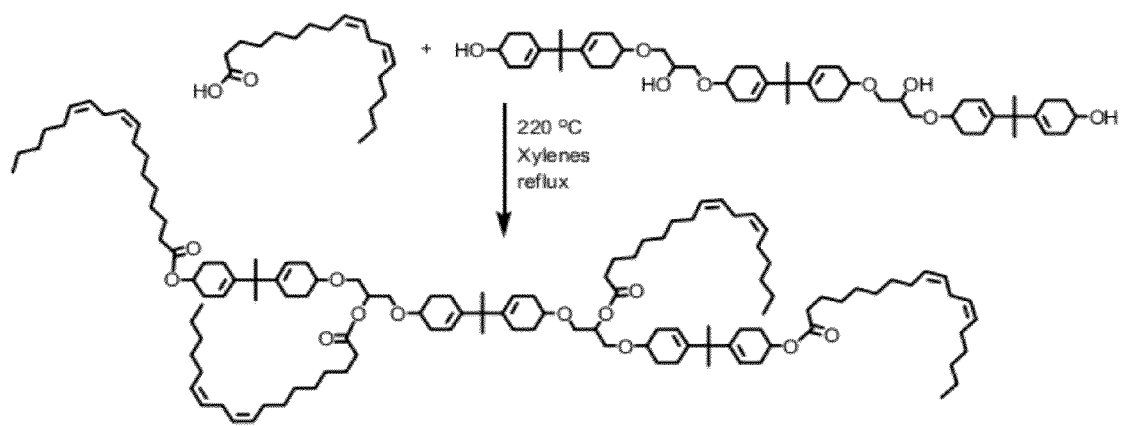
FIG. 19 shows an illustrative embodiment of a representative structure of an alkyd resin produced from a pHBPA polyol and linoleic acid as outlined in Example 5.

Preparation of a Representative alkyd Resin from pHBPA/epichlorohydrin polyol and a Representative Coating An alkyd resins is produced by charging a reaction vessel with 28.0 g (0.1 mol) of linoleic acid and 22.5 g pHBPA (0.05 mol excess OH) from Example 2, and 0.02 g of p-toluenesulfonic acid. The mixture is then purged with nitrogen. To the mixture is added 5% by weight xylene. A Dean-Stark trap is attached and the reaction vessel is heated to 230° C. and the xylenes reflux. Water is collected in the Dean-Stark trap. The reaction is carried out until the acid value is below 4 mg KOH/g of resin. An idealized structure is shown in FIG. 19. Molecular weight is 1985.

To the prepared alkyd resin (21.3 g) is added 4.0 g of a mixture of zero VOC solvents: acetone (15%), methyl acetate (15%), t-butyl acetate (40%), and p-chlorobenzotrifluoride (30%). A catalytic mixture (drier) comprising 13% zirconium octoate, 5% calcium octoate, and 1% cobalt octoate in mineral spirits is added to the alkyd carefully with stirring. The resin is applied to tin plated steel at a thickness of 3 mils and baked at 120° C. for 30 minutes to form the film.

Example 6

Figure 20:
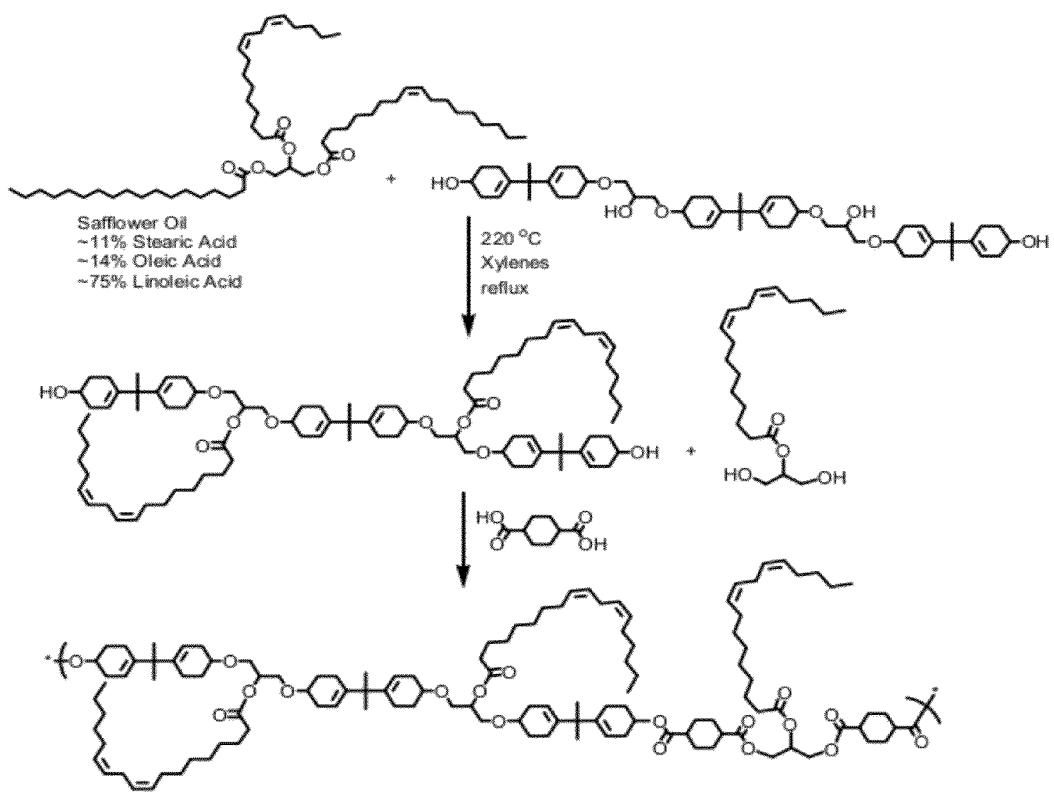
FIG. 20 depicts the synthesis of a representative structure of an alkyd resin from a pHBPA polyol and safflower oil using a monoglyceride process as outlined in Example 6.

Synthesis of a Representative alkyd from pHBPA using a mono glyceride Process Safflower oil (89.0 g, ~0.1 mol) as the triglyceride (FIG. 9) is measured into a 1 L kettle and purged with nitrogen. An alkyd resin is produced from safflower oil using the monoglyceride process from 45.0 g of pHBPA polyol from Example 2, 37.6 g of 1,2-cylcohexanedioic acid, 20 mL xylene, and 0.6 g of butylstannoic acid. Components are heated to 230° C. while under nitrogen atmosphere and the water collected until the desired acid value is obtained. The resin (FIG. 20) has a number average molecular weight ($\overline{M_n}$) of 4,500.

To the alkyd mixture is added a mixture of zero VOC solvents: acetone, methyl acetate, t-butyl acetate, and p-chlorobenzotrifluoride. A catalytic mixture (drier) comprising 13% zirconium octoate, 5% calcium octoate, and 1% cobalt octoate in mineral spirits is added (3.9 g) to alkyd resin carefully with stirring. The resin is applied to tin plated steel at a thickness of 4 mils and baked at 120° C. for 30 minutes to form the film.

Example 7

Figure 21:
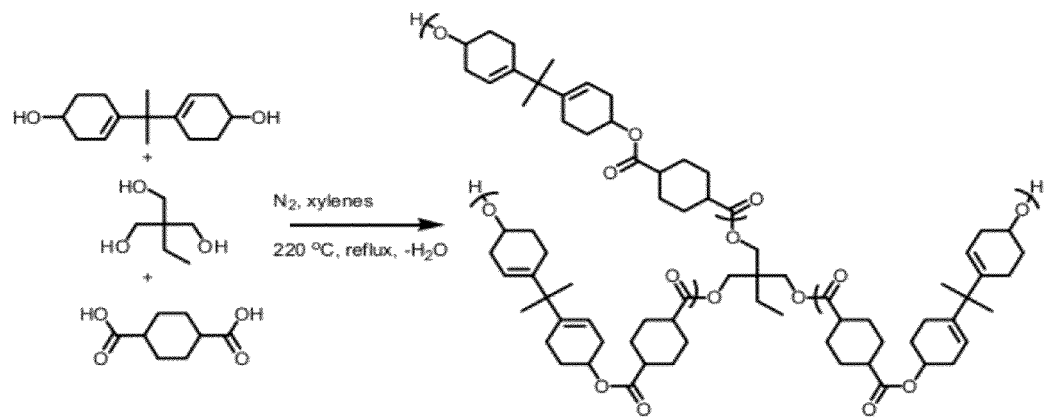
FIG. 21 depicts the synthesis of a representative polyester polyol formed from the procedure outlined in Example 7.

Synthesis of a Representative polyester resin from PHBA, trimethylolpropane, and 1,4-cyclohexanedioic acid 1,4-Cyclohexanedioic acid, 379.6 g, is added to a glass reaction vessel fitted with a mechanical stirrer, thermometer, Dean-Stark trap, condenser, nitrogen inlet, and vacuum. To the reaction vessel is added 472.7 g of pHBPA, 42.3 g of trimethylolpropane, and 0.4 g PTSA catalyst and 30 mL of xylene. The components are heated to 150° C. while under a nitrogen inlet. The xylene refluxes and water is collected in the trap. Once dimerization is complete (~20 mL of water collected) the system is heated to 220° C. The resin (FIG. 21) has a number average molecular weight ($\overline{M_n}$) of 1,715.

TABLE 1

Components used to produce a polyester polyol suitable for can coatings as outlined in Example 7.

| Raw Material | Structure | Mass Used | Mols | Equivalents |
|---|---|---|---|---|
| pHBPA |  | 472.7 | 2.0 | 4.0 |
| TMP | 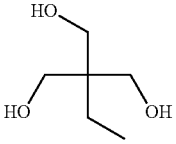 | 42.3 | 0.31 | 0.93 |
| CHDA | 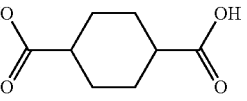 | 379.6 | 2.2 | 4.4 |

Example 8

Figure 22:
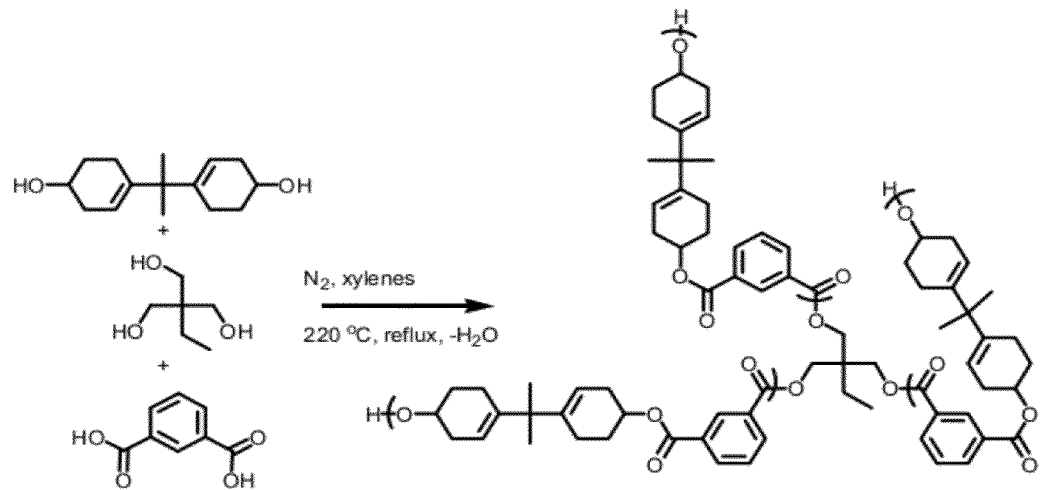
FIG. 22 depicts the synthesis of a representative polyester polyol formed from the reaction outlined in Example 8.

Synthesis of a Representative polyester resin from PHBA, trimethylolpropane, and isophthalic acid Example 8 is carried out in the same manner as Example 7 with the exception that 1,4-cyclohexanedioic acid is replaced with isophthalic acid. The resin (FIG. 22) has a number average molecular weight ($\overline{M_n}$) of 1825.

TABLE 2

Components used to produce a polyester polyol suitable for can coatings as outlined in Exmaple 8.

| Raw Material | Structure | Mass Used | Mols | Equivalents |
|---|---|---|---|---|
| pHBPA |  | 472.7 | 2.0 | 4.0 |

TABLE 2-continued

Components used to produce a polyester polyol suitable for can coatings as outlined in Exmaple 8.

| Raw Material | Structure | Mass Used | Mols | Equivalents |
|---|---|---|---|---|
| TMP | (structure) | 42.3 | 0.31 | 0.93 |
| IPA | (structure) | 365.5 | 2.2 | 4.4 |

Example 9

Figure 23:
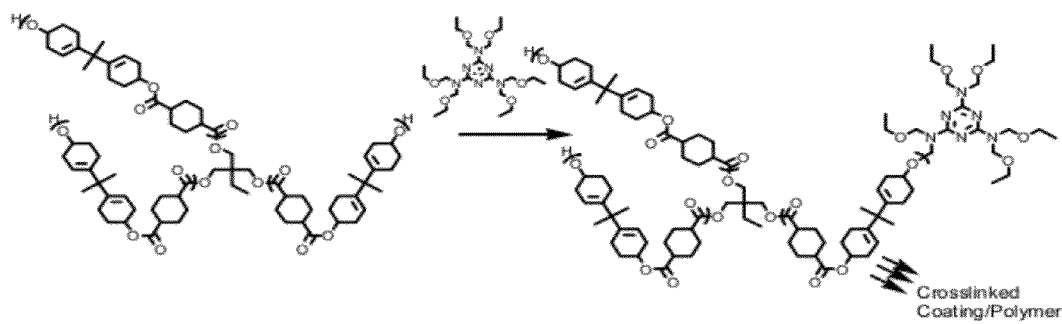
FIG. 23 depicts an illustrative embodiment of the cross-linking of polyester resins based upon pHBPA with a class I melamine formaldehyde resin, Example 9.

Synthesis of a Representative Polyester Coating using a melamine formaldehyde Cross-linker Polyester resin from Example 7, 10.0 g, is added to a 25.0 mL vial and 3.0 g of a mixture of zero VOC solvents: acetone (15%), methyl acetate (15%), t-butyl acetate (40%), and p-chlorobenzotrifluoride (30%) is added to the resin. A class I melamine formaldehyde resin, 1.5 g, is added to the beaker and mixed into the polyester resin. The mixture is sprayed onto tin plated steel at a thickness of 5 mils and allowed to partially dry. The coating is then baked at 130° C. for 45 minutes to form the polymerized film as shown in FIG. 23.

Example 10

Figure 24:
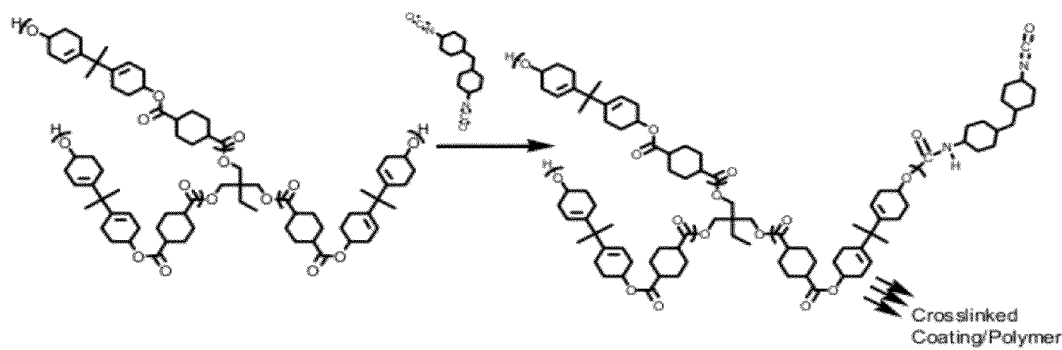
FIG. 24 depicts an illustrative embodiment of the cross-linking of a polyester resins based upon pHBPA with methylene-bis(4-cyclohexylisocyanate), Example 10.

Synthesis of a Representative polyurethane and Coating from pHBPA Polyester and methylene-bis(4-cyclohexylisocyanate)

pHBPA (11.4 g) polyester resin from Example 7 is weighed into a 25 ml vial. To the resin is added 2.0 g of a mixture of zero VOC solvents: methyl acetate (30%), t-butyl acetate (40%), and p-chlorobenzotrifluoride (30%). The solution is combined with 2.0 g of methylene-bis(4-cyclohexylisocyanate) and mixed well. The solution is applied to tin coated steel and heated to 120° C. for 20 minutes to form the cross-linked coating (FIG. 24).

Example 11

Figure 25:
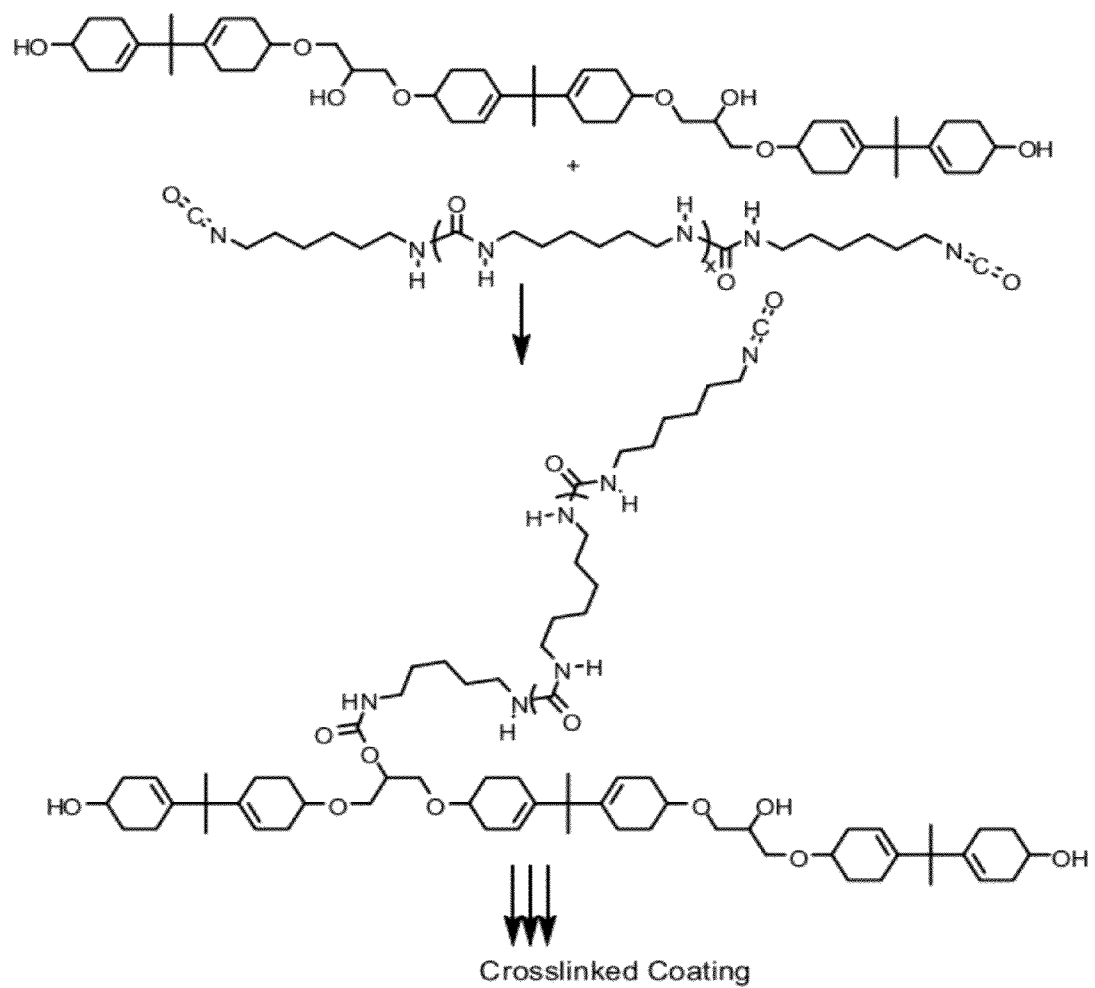
FIG. 25 depicts an illustrative embodiment of the cross-linking of a pHBPA polyol with a low viscosity poly(isocyanate) resin to provide a polyurethane, Example 11.
Figure 26:
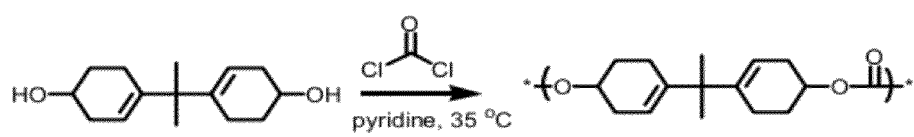
FIG. 26 depicts the synthesis of a representative polycarbonate resin from phosgene and pHBPA, Example 12.
Figure 27:
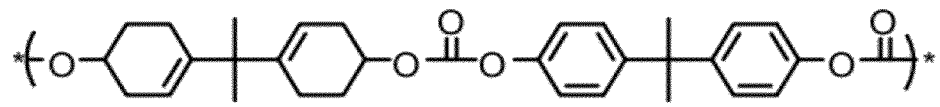
FIG. 27 depicts the formula of a representative polycarbonate produced according to Example 13.
Figure 28:
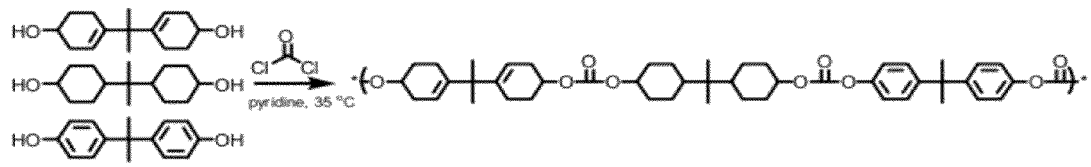
FIG. 28 depicts the synthesis of a representative polycarbonate resin from phosgene and pHBPA, HBPA, and BPA as in Example 14
Figure 29:
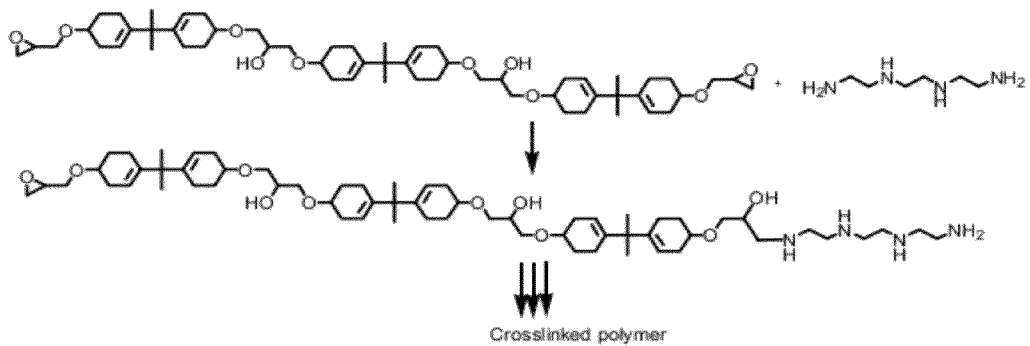
FIG. 29 depicts an illustrative embodiment of the cross-linking of a representative pHBPA epoxy resin with an amine as in Example 15.

Synthesis of a Representative polyurethane Utilizing a pHBPA and a Low-viscosity HDI Biuret pHBPA polyol (21.4 g) resin from Example 2 is weighed into a 50 mL vial. To the resin is added 4.0 g of a mixture of zero VOC solvents: methyl acetate (30%), t-butyl acetate (40%), and p-chlorobenzotrifluoride (30%). The solution is combined with 18.0 g of Desmodur N 3200 poly(isocyanate) (low-viscosity HDI biuret) resin from Bayer and mixed well. The solution is applied to tin coated steel and heated to 120° C. for 20 minutes to form the cross-linked coating (FIG. 25).

Example 12

Preparation of a Representative Polycarbonate Resin from pHBPA

A solution was formed from dissolving 25 g of pHBPA into 250 mL of pyridine. The temperature of the reaction is kept at 35° C. by an oil bath set to 35° C. Phosgene is bubbled through the solution at a rate of 0.40 gram per minute for 70 minutes while rapidly stirring the solution. The viscosity of the solution increased in viscosity while during the phosgene addition. The resulting polymer having a molecular weight of about 25,000 Daltons is then precipitated, placed in a Soxhlet extractor and washed with isopropanol and then dried under vacuum at 75° C.

Example 13

Preparation of a Representative Polycarbonate Resin from pHBPA and Bisphenol-A

The procedure outlined in Example 12 is followed with the exception that 20 g of bisphenol-A and 5 g of pHBPA are used.

Example 14

Preparation of a polycarbonate Resin from pHBPA, Hydrogenated Bisphenol-A and Bisphenol-A A polycarbonate resin is produced using the procedure outlined in Example 12 with the exception that 10 g of bisphenol-A, 10 g of hydrogenated bisphenol-A and 10 g of pHBPA are used.

Example 15

Preparation of a Representative Coating from pHBPA Glycidyl Ether and Triethylenetetramine pHBPA diglycidyl ether (44.1 g of polymer of Example 3) with an EEW of 441 is diluted with methyl acetate (2.0 g), t-butyl acetate (7.0 g), and p-chlorobenzotrifluoride (7.0 g). To this mixture is added 6.8 g of triethylenetetramine. The solution is allowed to stand for 20 minutes. The solution is then sprayed onto tin coated steel plates and heated to 90° C. for 15 minutes.

Example 16

Preparation of an Epoxy Coating Utilizing pHBPA and Having a Long Shelf Life

Figure 30:
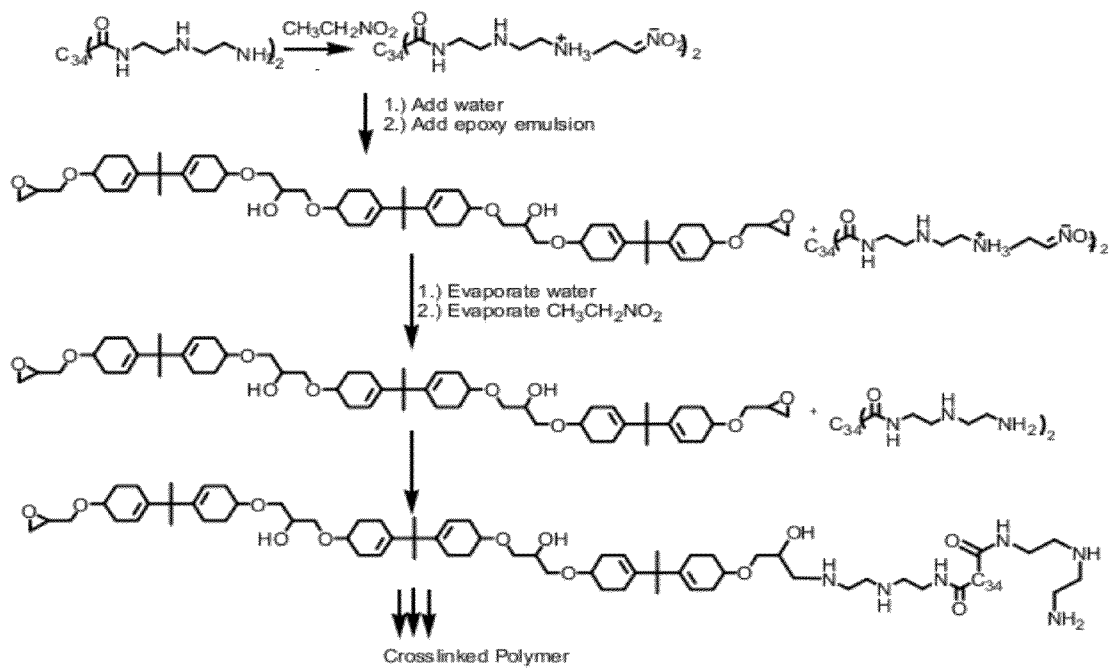
FIG. 30 depicts an illustrative embodiment for preparing a representative water borne pHBPA glycidyl ether epoxy system as outlined in Example 17.

The procedure outlined in Example 14 is followed with the exception that triethylenetetraamine is replaced with the bis-imide of diethylenetriamine to create an epoxy resin that is thermally activated and has a six month shelf life. The solution is diluted with methyl acetate, t-butyl acetate, and p-chlorobenzotrifluoride and is sprayed onto tin coated steel. The coating is heated to 120° C. for 30 minutes to cure the resin by releasing diethylenetriamine, which reacts with the epoxy groups and crosslinks the polymer. This system is useful for creating 1K coatings that have long shelf life. The cure mechanism is the same as that illustrated in FIG. 30.

Example 17

Preparation of a Representative Water Borne Epoxy Coating Utilizing pHBPA pHBPA diglycidyl ether (Example 3), 44.1 g with and EEW of 441 is diluted with 25 g of 1-butanol. An amine resin (16.3 g) of the empirical formula $C_{34}(C(=O)-NH-CH_2-CH_2-NH-CH_2CH_2-NH_2)_2$ is reacted with ethyl nitrate to form the amine salt. Water, 27.0 g, is added to the amine salt. The pHBPA glycidyl ether/butanol solution is then added to the water/amine solution slowly with stirring. The butanol is then removed under reduced pressure. The water borne epoxy is then either spread or spray applied to tin-coated steel. The system is heated to 100° C. for 30 minutes to polymerize the coating.

Example 18

Preparation of a Representative Cross-linked pHBPA Polyester Coating pHBPA polyester, 10.0 g, from Example 7 is weighed into a 25 mL vial. To the resin is added 0.3 g of methylethylketone peroxide. A solvent system containing t-butyl acetate, para-chlorobenzotrifluride, and acetone may be used to dissolve the reactant mixture. The resulting product mixture, optionally with a suitable solvent if needed, is then drawn on to a steel plate and heated under nitrogen for 30 minutes at 135° C. to form a hard coating.

Example 19

Preparation of pHBPA Cross-linked Using Acrylic Moieties pHBPA polyester, 10.0 g, from Example 7 is weighed into a 25 mL vial and 2.5 g of cyclohexyl methacrylate and 2.5 g of butyl methacrylate are added and well mixed. To the resin/acrylic solution is added 0.4 g of methylethylketone peroxide. The mixture is then drawn on to a steel plate and heated under nitrogen for 30 minutes at 130° C. to form a hard coating.

Example 20

Cross-linking Polycarbonate Resin through the pHBPA Moieties pHBPA-co-bisphenol-A polycarbonate, 15.0 g, from Example 13 is weighed into a 25 mL vial and 7.0 g of dioxane added. Then 4.0 g of cyclohexyl methacrylate and 4.0 g of butyl methacrylate are added and all components are well mixed and forms a solution. To the resin/acrylic solution is added 0.6 g of methylethylketone peroxide. The mixture is then drawn on to a steel plate and heated under nitrogen to 90° C. for 10 minutes to evaporate the dioxane and then 135° C. for 30 minutes at 130° C. to form a hard coating. The cross-linking reactions help lock the polymer backbone and prevent hydrolyzing and leeching of bisphenol-A.

EQUIVALENTS

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

What is claimed is:

1. A polymer, comprising at least one repeating unit, wherein the repeating unit is a partially hydrogenated bisphenol-A containing unit of formula (I):

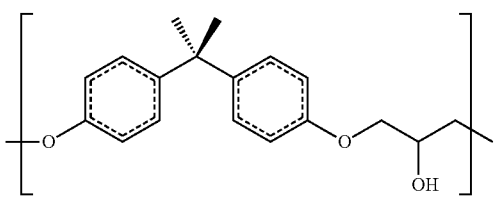

wherein the dashed line indicates the presence of one or two double bonds at any position within each ring.

2. The polymer of claim 1, wherein the polymer is an epoxy resin.

3. The polymer of claim 1, wherein the polymer is cross-linked with a diisocyanate or a polyisocyanate resin to form a polyurethane.

4. The polymer of claim 3, wherein the polymer is cross-linked with a diisocyanate selected from the group consisting of methylene-bis-(4-cyclohexylisocyanate), hexamethylene diisocyanate, diphenylmethane diisocyanate, toluene diisocyanate, and isophorone diisocyanate or is cross-linked with a polyisocyanate resin based on a diisocyanate selected from the group consisting of methylene-bis-(4-cyclohexylisocyanate), hexamethylene diisocyanate, diphenylmethane diisocyanate, toluene diisocyanate, and isophorone diisocyanate.

5. A composition comprising a polymer comprising at least one repeating unit of formula (I):

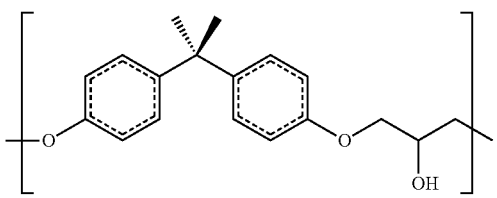

wherein the dashed line indicates the presence of one or two double bonds at any position within each ring, and the composition is formulated for coating a food or beverage container or a medical device.

6. A food or beverage container or a medical device, comprising a surface coated at least in part with a coating composition a polymer comprising at least one repeating unit of formula (I):

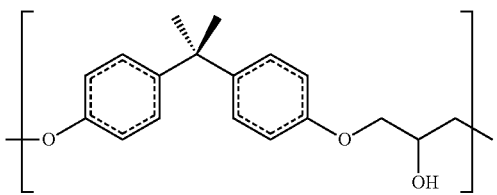

wherein the dashed line indicates the presence of one or two double bonds at any position within each ring.

7. A food or beverage container or a medical device, comprising a surface, wherein the surface comprises a polymer comprising at least one repeating unit of formula (I):

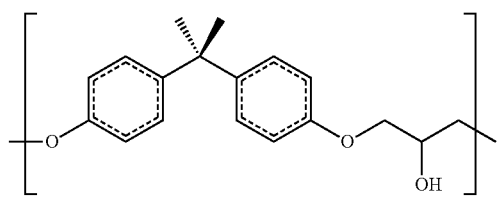

wherein the dashed line indicates the presence of one or two double bonds at any position within each ring.

8. The polymer of claim 1, wherein the at least one repeating unit has a formula selected from the group consisting of

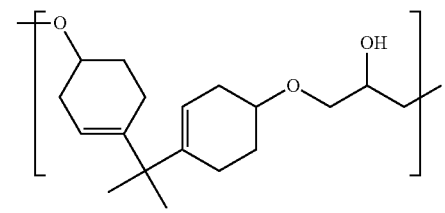

,

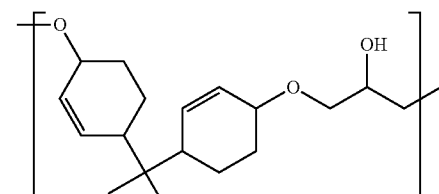

,

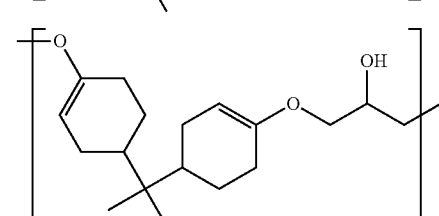

and

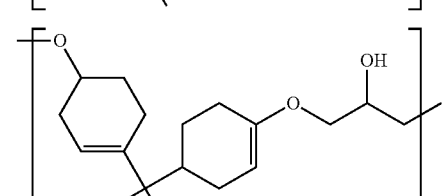

.

* * * * *

UNITED STATES PATENT AND TRADEMARK OFFICE
CERTIFICATE OF CORRECTION

PATENT NO. : 8,802,792 B2
APPLICATION NO. : 13/145291
DATED : August 12, 2014
INVENTOR(S) : Carlson et al.

It is certified that error appears in the above-identified patent and that said Letters Patent is hereby corrected as shown below:

On the Title Page, item (56), under "OTHER PUBLICATIONS", in Column 2, Line 7, delete "polymers" and insert -- polymer's --, therefor.

On the Title Page, item (56), under "OTHER PUBLICATIONS", in Column 2, Line 14, delete "and" and insert -- und --, therefor.

In the Specification,

In Column 2, Line 42, delete "(4-cyclohyxylisocyanate)," and insert -- (4-cyclohexylisocyanate), --, therefor.

In Column 5, Lines 64-65, delete "cylcohexane-based" and insert -- cyclohexane-based --, therefor.

In Column 6, Line 2, delete "copolyermized" and insert -- copolymerized --, therefor.

In Column 9, Line 65, delete "proton a" and insert -- proton α --, therefor.

In Column 9, Line 67, delete "at the a" and insert -- at the α --, therefor.

In Column 10, Line 60, delete "An polyol" and insert -- A polyol --, therefor.

In Column 13, Line 18, delete "cylcohexanedimethanol" and insert -- cyclohexanedimethanol --, therefor.

In Column 13, Line 25, delete "cylcohexenedimethanol" and insert -- cyclohexenedimethanol --, therefor.

In Column 14, Line 19, delete "crosslinker A" and insert -- crosslinker. A --, therefor.

Signed and Sealed this
Tenth Day of March, 2015

Michelle K. Lee
*Deputy Director of the United States Patent and Trademark Office*

CERTIFICATE OF CORRECTION (continued)
U.S. Pat. No. 8,802,792 B2

In Column 18, Line 32, delete "ends," and insert -- end, --, therefor.

In Column 21, Line 10, delete "1,2-cylcohexanedioic" and insert -- 1,2-cyclohexanedioic --, therefor.

In Column 23, in Table 2, Line 2, delete "Exmaple 8." and insert -- Example 8. --, therefor.

In Column 24, Line 67, delete "triethylenetetraamine" and insert -- triethylenetetramine --, therefor.

In Column 25, Lines 36-37, delete "para-chlorobenzotrifluride," and insert
-- para-chlorobenzotrifluoride, --, therefor.